United States Patent
McKeefery

(10) Patent No.: US 11,737,049 B1
(45) Date of Patent: Aug. 22, 2023

(54) SYSTEM AND METHOD FOR RAPID RELEASE OF POLICY IMPLEMENTED ON A MOBILE DEVICE

(71) Applicant: NoCell Technologies, LLC, Aliso Viejo, CA (US)

(72) Inventor: Donald McKeefery, Irvine, CA (US)

(73) Assignee: NoCell Technologies, LLC, Aliso Viejo, CA (US)

( * ) Notice: Subject to any disclaimer, the term of this patent is extended or adjusted under 35 U.S.C. 154(b) by 40 days.

(21) Appl. No.: 17/345,385

(22) Filed: Jun. 11, 2021

(51) Int. Cl.
*H04W 64/00* (2009.01)
*H04B 17/318* (2015.01)

(52) U.S. Cl.
CPC ........ *H04W 64/006* (2013.01); *H04B 17/318* (2015.01)

(58) Field of Classification Search
CPC .......................... H04W 64/006; H04B 17/318
USPC ...................................................... 455/456.1
See application file for complete search history.

(56) References Cited

U.S. PATENT DOCUMENTS

| | | | |
|---|---|---|---|
| 6,714,894 B1 | 3/2004 | Tobey et al. |
| 7,389,178 B2 | 6/2008 | Raz et al. |
| 7,561,054 B2 | 7/2009 | Raz et al. |
| 8,527,013 B2 | 9/2013 | Guba et al. |
| 8,682,572 B2 | 3/2014 | Raz et al. |
| 8,706,872 B2 | 4/2014 | Moussavian et al. |
| 8,718,536 B2 | 5/2014 | Hannon |
| 8,805,639 B1 | 8/2014 | Musicant et al. |
| D712,928 S | 9/2014 | Brener et al. |
| 8,896,465 B2 | 11/2014 | Raz et al. |
| 8,966,064 B2 | 2/2015 | Moussavian et al. |
| 8,983,710 B2 | 3/2015 | Raz et al. |
| 8,994,492 B2 | 3/2015 | Farhan et al. |
| 9,043,462 B2 | 5/2015 | Badiee et al. |
| 9,079,494 B2 | 7/2015 | Skelton |
| 9,185,526 B2 | 11/2015 | Guba et al. |
| 9,283,931 B2 | 3/2016 | Skelton |
| 9,338,605 B2 | 5/2016 | Guba et al. |
| 9,342,983 B1 | 5/2016 | Brener et al. |

(Continued)

OTHER PUBLICATIONS

Motion Intelligence, "How Motion Intelligence's Solution Works" https://vimeo.com/448673163, last accessed Jan. 20, 2022.

(Continued)

*Primary Examiner* — Huy C Ho
(74) *Attorney, Agent, or Firm* — Rutan & Tucker, LLP; Kyle M. St. James

(57) ABSTRACT

A computerized method for releasing a set of policies implemented on a network device is disclosed including detecting a speed of the network device is zero mph, initiating a policy release counter and determining a position of the network device has changed prior to the policy release counter satisfying a counting requirement. The computerized method further includes detecting the speed of the network device is greater than zero mph and less than a threshold speed, requesting first and second RSSI values from the transceiver, where the first and second RSSI values correspond to first and second communications transmitted by the network device to the transceiver separated by a delay, comparing the first RSSI value and the second RSSI value, and when the second RSSI value is greater than the first RSSI value, releasing the set of policies implemented on the network device.

24 Claims, 14 Drawing Sheets

(56) References Cited

U.S. PATENT DOCUMENTS

| | | |
|---|---|---|
| 9,369,196 B2 | 6/2016 | Hannon |
| 9,379,805 B2 | 6/2016 | Hannon |
| 9,398,421 B2 | 7/2016 | Guba et al. |
| 9,660,923 B2 | 5/2017 | Badiee et al. |
| 9,692,880 B2 | 6/2017 | Hannon |
| 9,707,928 B2 | 7/2017 | Skelton |
| 9,847,948 B2 | 12/2017 | Badiee et al. |
| 9,854,393 B2 | 12/2017 | Moussavian et al. |
| 9,854,433 B2 | 12/2017 | Hannon |
| 9,872,225 B2 | 1/2018 | Guba et al. |
| 9,887,887 B2 | 2/2018 | Hunter et al. |
| 9,955,352 B2 | 4/2018 | Mahaffey et al. |
| 10,025,958 B1 | 7/2018 | Todasco |
| 10,075,764 B2 | 9/2018 | Moussavian et al. |
| 10,079,931 B2 | 9/2018 | Nicholls et al. |
| 10,084,603 B2 | 9/2018 | Rogers et al. |
| 10,104,063 B2 | 10/2018 | Hu et al. |
| 10,122,846 B2 | 11/2018 | Hannon |
| 10,194,017 B2 | 1/2019 | Skelton |
| 10,205,819 B2 | 2/2019 | Hannon et al. |
| 10,268,530 B2 | 4/2019 | Breaux et al. |
| 10,271,265 B2 | 4/2019 | Breaux, III et al. |
| 10,412,538 B2 | 9/2019 | Moussavian et al. |
| 10,440,063 B1 | 10/2019 | Nevick et al. |
| 10,477,454 B2 | 11/2019 | Breaux et al. |
| 10,547,736 B2 | 1/2020 | Hannon et al. |
| 10,649,825 B2 | 5/2020 | Breaux et al. |
| 10,805,861 B2 | 10/2020 | Breaux, III et al. |
| 10,834,249 B2 | 11/2020 | Nicholls et al. |
| 10,868,837 B2 | 12/2020 | Nevick et al. |
| 10,868,838 B2 | 12/2020 | Nevick et al. |
| 2007/0072553 A1* | 3/2007 | Barbera ............ H04M 1/72463 455/67.11 |
| 2011/0009107 A1* | 1/2011 | Guba ................... H04W 4/027 455/418 |
| 2016/0286384 A1* | 9/2016 | Manente ........... H04M 1/72463 |

OTHER PUBLICATIONS

Motion Intelligence, "Why Motion Intelligence" https://vimeo.com/448671482, last accessed Jan. 20, 2022.

* cited by examiner

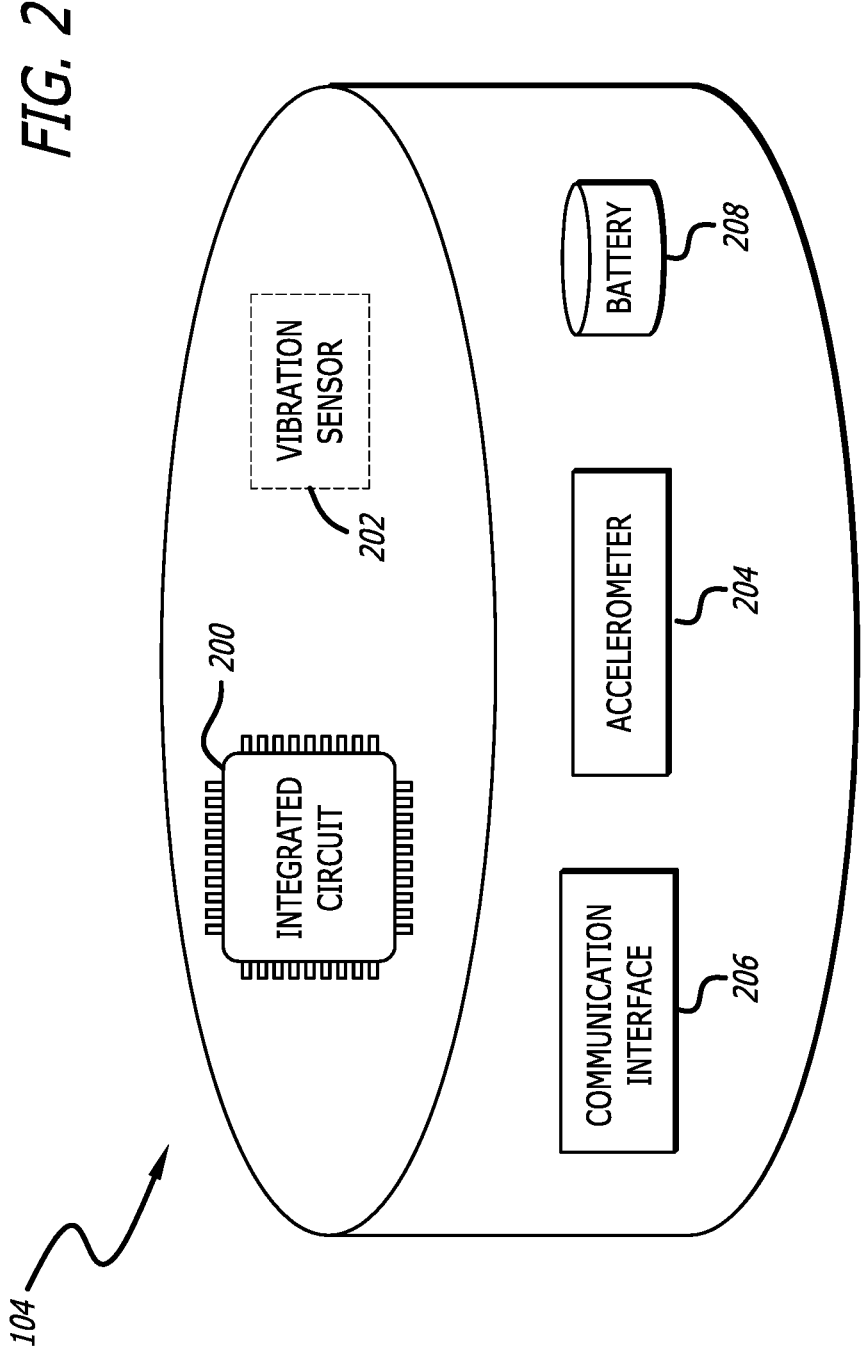

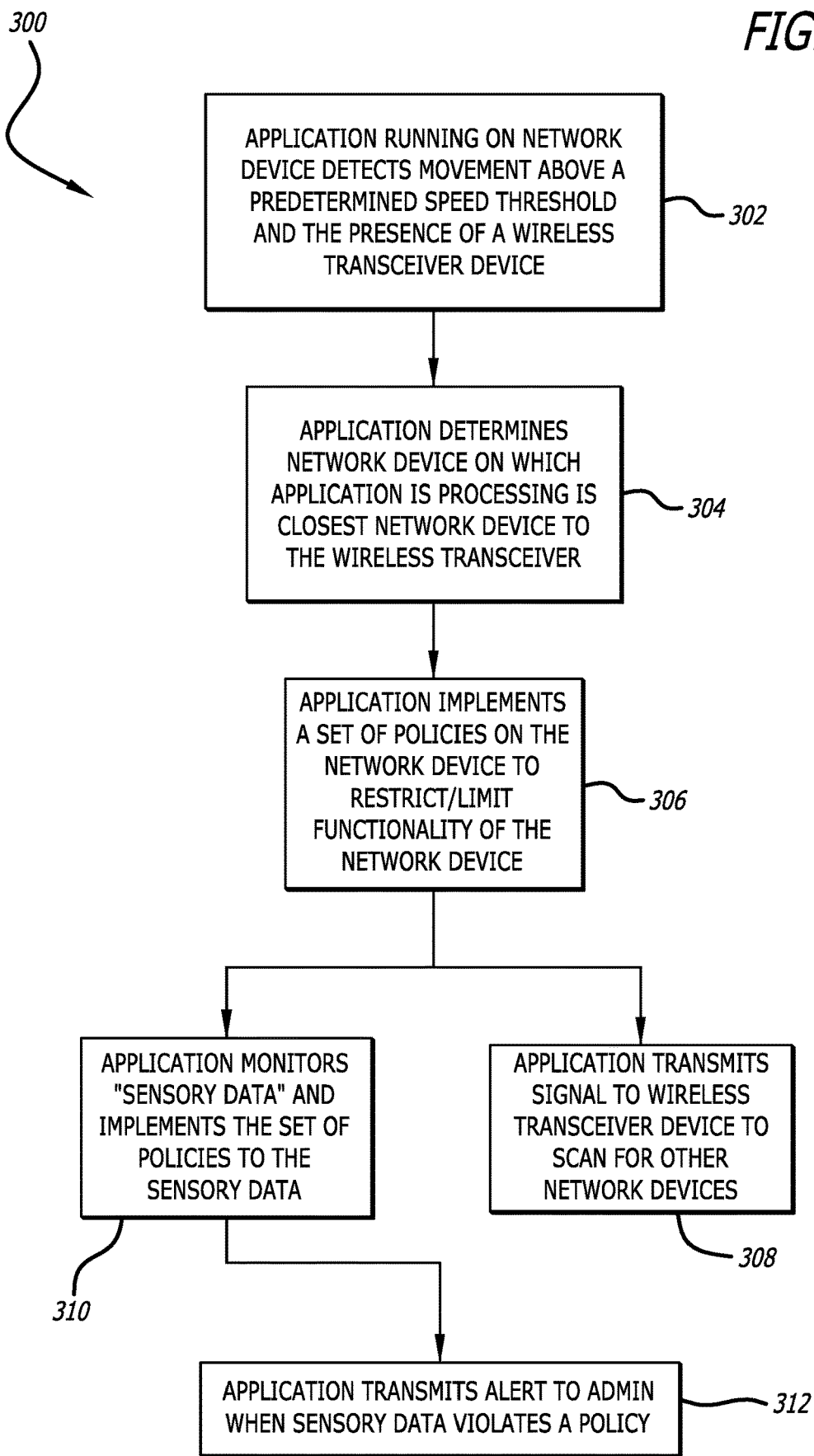

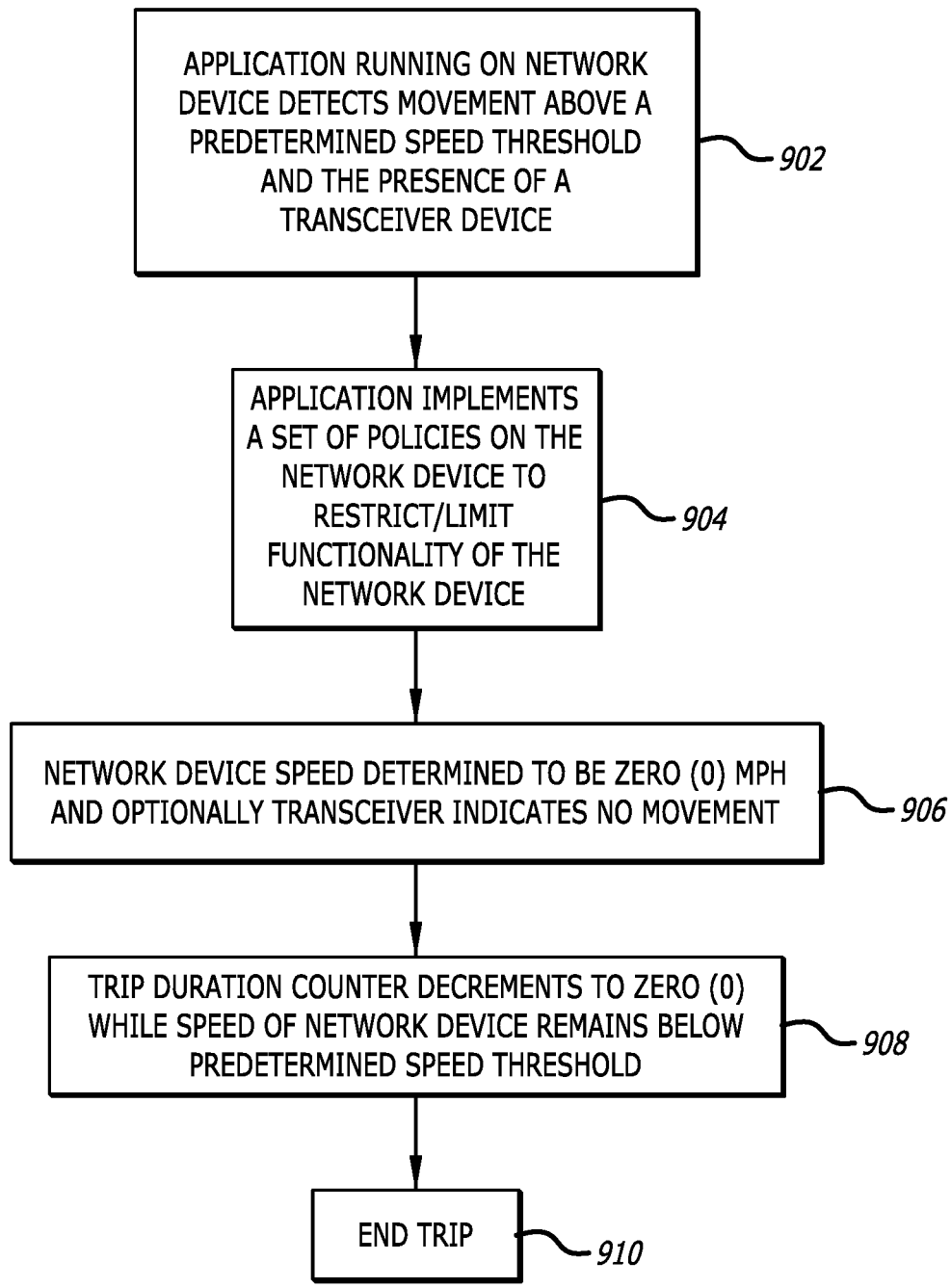

SYSTEM AND METHOD FOR RAPID RELEASE OF POLICY IMPLEMENTED ON A MOBILE DEVICE

FIELD

Embodiments of the disclosure relate to the field of restricting use of network devices. More specifically, one embodiment of the disclosure relates to a method of releasing a set of policies implemented on a network device that are configured to restrict or limit the use of a network device when operating in a vehicle. Further, some embodiments of the disclosure relate to recording motion events of the network device when operating in a vehicle and determining whether stoppages of the vehicle indicate an end of a trip.

GENERAL BACKGROUND

Distractions while driving, especially those from electronic devices, are at an all-time high. As mobile devices, for example, cell phones, have become ubiquitous, it is commonplace for a driver to get into an automobile, start driving and become distracted with his/her cell phone. For instance, drivers often receive and respond to text messages or emails, browse the internet, or browse social media platforms while driving.

Driving while distracted as a result of the presence of electronic devices within reach is a dangerous, and at times, deadly, situation. Although some states have outlawed the act of using a cell phone while driving, not all drivers regularly adhere to these laws. Additionally, drivers may be distracted merely by notification alerts received by a cell phone. For example, a cell phone placed in a cup holder of the center console may alert the driver to a new text message or email via an audible and/or visual notification. The notification may cause the driver to take his/her eyes off of the road momentarily, which has the potential to result in an accident.

Many parents or employers wish to prevent their children/employees from being distracted by the child's or employee's cell phone while driving but also want their children or employees to have a cell phone in case of emergency. However, the use of some functionality of a cell phone may be warranted while driving. For example, a functionality of a cell phone that provides turn-by-turn directions may be used by some drivers and does not cause unnecessary distractions. Further, some drivers may be able to connect their cell phones to the automobile's audio system and play music while driving without causing unnecessary distractions. Additionally, once a child or employee completes his/her drive, there is no need to prevent the child or employee from using his/her cell phone.

Thus, a system, method and apparatus are needed to restrict or limit the use of some or all functionality of certain network devices, such as mobile devices for example, within a predefined area of an interior cabin of an automobile when the automobile is in use.

BRIEF DESCRIPTION OF THE DRAWINGS

Embodiments of the invention are illustrated by way of example and not by way of limitation in the figures of the accompanying drawings, in which like references indicate similar elements and in which:

FIG. 2 is an exemplary block diagram of a wireless transceiver of the policy enforcement system of FIG. 1A.

FIG. 3 is a flowchart illustrating an exemplary process of implementing and monitoring a set of policies by a policy enforcement application of the policy enforcement system of FIG. 1A.

FIG. 9A illustrates a flowchart of an exemplary process of determining a duration of a trip following the implementation of a set of policies on a network device by the policy enforcement application of FIG. 6.

DETAILED DESCRIPTION

Figure 1A:
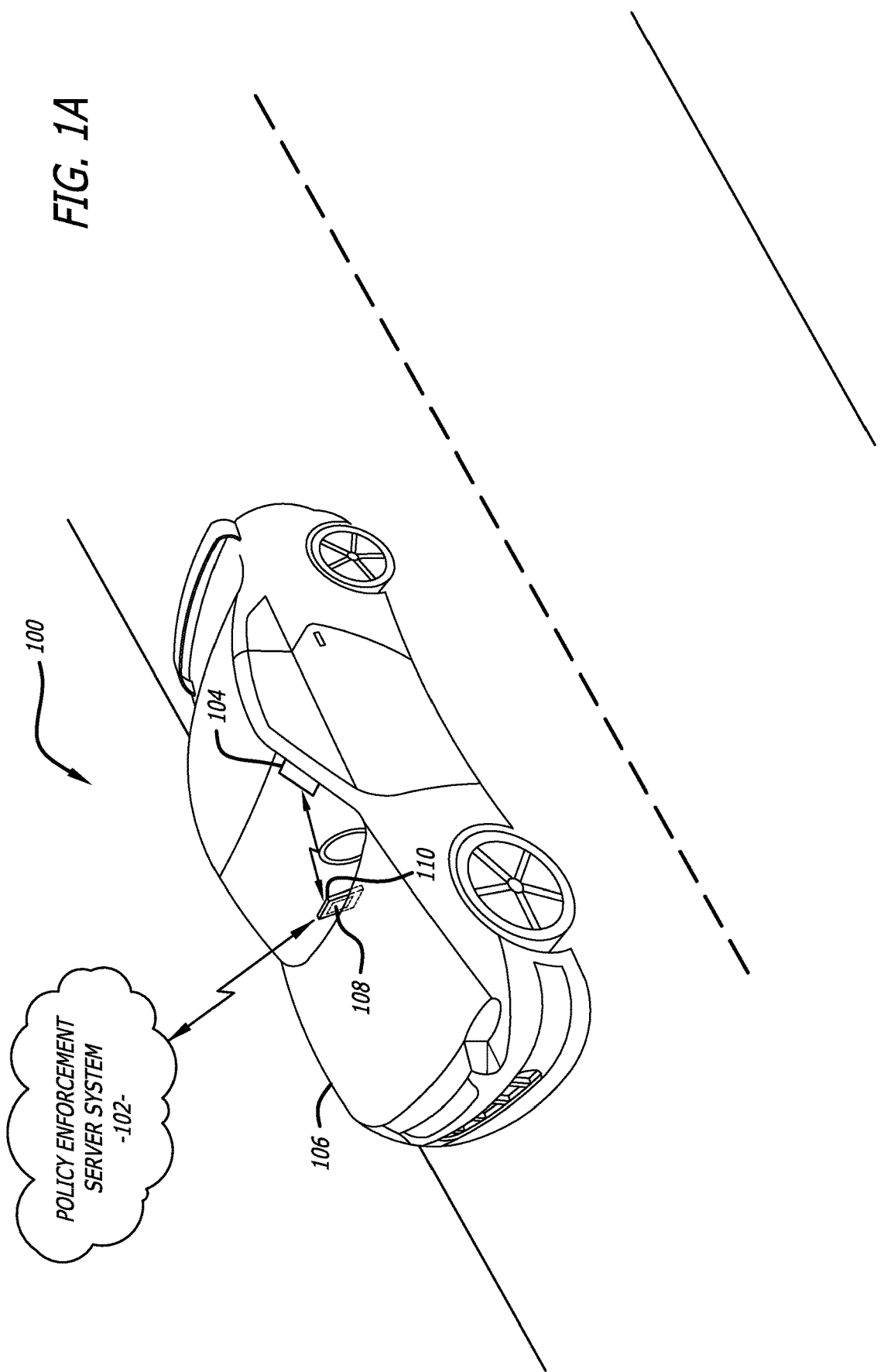
FIG. 1A is an exemplary illustration of a deployment of a policy enforcement system in connection with a first vehicle.

Embodiments of a system and methods are described for determining whether a network device is a driver device on which a set of policies are to be implemented to restrict or limit the use of the network device when operating in the vehicle. For purposes of clarity, a driver device may be considered as a network device on which a set of policies is to be implemented as compared to other network devices within the vehicle (or "passenger devices") on which a set of policies is not to be implemented. More particularly, a driver device may be assumed to be the network device that the driver of the vehicle will attempt to operate (e.g., the network device physically located closest to the driver).

Described herein is a policy enforcement system that includes a transceiver and a policy enforcement application operating on a network device. In some embodiments, the policy enforcement application may be downloaded on the network device. Generally, the policy enforcement system performs various methods to determine whether one or more network devices are located within an interior cabin space of a vehicle and whether the vehicle, along with each the network device, is moving at a speed above a predetermined threshold. When the policy enforcement system determines that the vehicle and a network device are traveling at a speed above the predetermined threshold, the policy enforcement application operating on the network device implements a set of policies that restrict or limit the use of the network device when operating in the vehicle. For example, the policy enforcement application may restrict or disable one or more predetermined functionalities of the network device. For instance, the functionality to make phone calls or receive emails or other messages may be prevented while the set of policies are implemented. Additional examples of restricting functionality may include, but are not limited or restricted to, prevention of the use of social media applications, prevention of the use of a camera, preventing of the use of internet browser applications, etc.

The transceiver may be an electronic device capable of transmitting wireless signals, such as BLUETOOTH® beacons (e.g., BLUETOOTH® Low Energy (BLE)). Herein, the terms "transceiver" and "wireless transceiver" are used interchangeably, where wireless may refer to the transmission or receipt of data to or from a network device located within a proximity of the transceiver, where the proximity may include the interior cabin of the vehicle in which the transceiver is located as well as a surrounding area. For instance, the proximity of the transceiver may be an area defined by a radius of a circumference where the radius extends from the transceiver. As described below, the transceiver and a network device within proximity to the transceiver may communicate via an exchange of data, such as in the form of a wireless message. Based on the exchanged data, the policy enforcement application operating on the network device may implement a set of policies to restrict or limit the use of the network device when operating in the vehicle. In some embodiments, the transceiver may be located at a position within an interior cabin of a vehicle that is in close proximity to a driver's seat or to the steering wheel relative to other seats within the vehicle. For example, the transceiver may be affixed to the dashboard behind the steering wheel or in line with a driver's seat. In other examples, the transceiver may be affixed to the ceiling of the vehicle above the steering wheel or the driver's seat. In yet other embodiments the transceiver may be affixed to an upper left corner, a lower left corner or generally the left side of the vehicle's windshield relative to the driver's perspective.

The policy enforcement system may also monitor use, or attempted use, of a network device. For example, the policy enforcement application may monitor motion of the network device and determine whether such motion corresponds to a phone handling event, i.e., where the network device is being handled by a person. The policy enforcement application may also monitor the speed at which the network device is traveling to determine whether the set of policies should remain implemented or be released (e.g., no longer implemented). In some embodiments, the policy enforcement application may obtain data from the transceiver, where such data may be utilized by the policy enforcement application, in addition to the speed at which the network device is traveling, to determine whether the set of policies should remain implemented or be released.

Additionally, as will be discussed in further detail below, the policy enforcement system may perform operations that determine which network device of a plurality of network devices is a driver device on which a set of policies is to be implemented when the vehicle is in operation.

The policy enforcement system may perform additional operations and/or functionalities not explicitly described above that will become apparent throughout the description below and in view of the corresponding figures.

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

As mentioned above, the terms "transceiver" and "wireless transceiver" may be used interchangeably. Additionally, the term wireless transceiver refers to an electronic device configured to transmit and/or receive a wireless signal. The wireless transceiver may transmit data using any wireless technology, examples of which may include, but are not limited or restricted to, Wi-Fi, BLUETOOTH®, BLUETOOTH® Low Energy (BLE), radio waves (e.g., radio-frequency identification), one or more beacons, etc. In one embodiment, a wireless transceiver may refer to a communication interface of the center console of an automobile. In a second embodiment, a wireless transceiver may refer to a standalone electronic device that provides a wireless communication interface.

The term "computerized" generally represents that any corresponding operations are conducted by hardware in combination with software and/or firmware.

The term "network device" may be construed as a physical, electronic device or a virtual electronic device that is based on the execution of one or more software modules. The network device may be communicatively coupled to a public network such as the Internet or a private network such as a wireless data telecommunication network, wide area network, a type of local area network (LAN), or a combination of networks. Examples of the network device may include, but are not limited or restricted to, a physical electronic device (e.g., a personal computer such as a desktop, laptop, tablet or netbook; a mobile phone; a standalone appliance; a sensor; etc.). A network device may feature a plurality of electronic components, including one or more hardware processors (generally referred to as "processor"), at least one non-transitory storage medium, and an (network and/or I/O) interface. These components may be encased in a housing, which may be made entirely or partially of a rigid material (e.g., hard plastic, metal, glass, composites, or any combination thereof) that protects these components from certain environmental conditions.

The term "message" generally refers to any type of signaling such as wireless signaling including a beacon signal. Alternatively, the message may be information in a prescribed format and transmitted in accordance with a suitable delivery protocol. Hence, each message may be in the form of one or more packets, frames, or any other wireless signaling having the prescribed format.

The term "transmission medium" may be construed as a physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture—Policy Enforcement System

Referring to FIG. 1A, an exemplary illustration of a deployment of a policy enforcement system in connection with a first vehicle is shown. The policy enforcement system 100 includes a policy enforcement server system 102, a network device sensor 104 (also referred to herein as a "wireless transceiver") and an application 108. As illustrated, the policy enforcement system 100 is deployed in connection with the vehicle 106 wherein the wireless transceiver 104 and a network device 110 having the application 108 installed thereon are located within the vehicle 106. In one embodiment as illustrated, the policy enforcement server system 102 is in communication with the application 108 through the network device 110. However, in other embodiments, each of the components of the policy enforcement system 100 are in communication and operate collectively to enforce one or more sets of policies.

In particular, at a high-level, the wireless transceiver 104, the application 108 and the network device 110 perform operations to determine whether the vehicle 106 is moving and whether a set of policies is to be implemented with respect to the network device 110 based on any detected movement of the vehicle 106. In various embodiments, the application 108 may obtain sensory data from components of the network device 110 in order to determine movement (e.g., from an accelerometer and/or from a GPS unit). Alternatively, or in addition to, the wireless transceiver 104 may capture movement data via an accelerometer and/or vibration data via a vibration sensor. As will be discussed below, the movement/vibration data may be provided to the application 108 and be utilized by the application 108 in determining whether implementation of the set of policies is to be continued. As used herein, sensory data refers to any data associated with data obtained through one or more sensors (e.g., accelerometer, GPS unit, gyroscope, vibration sensor, etc.).

Figure 1B:
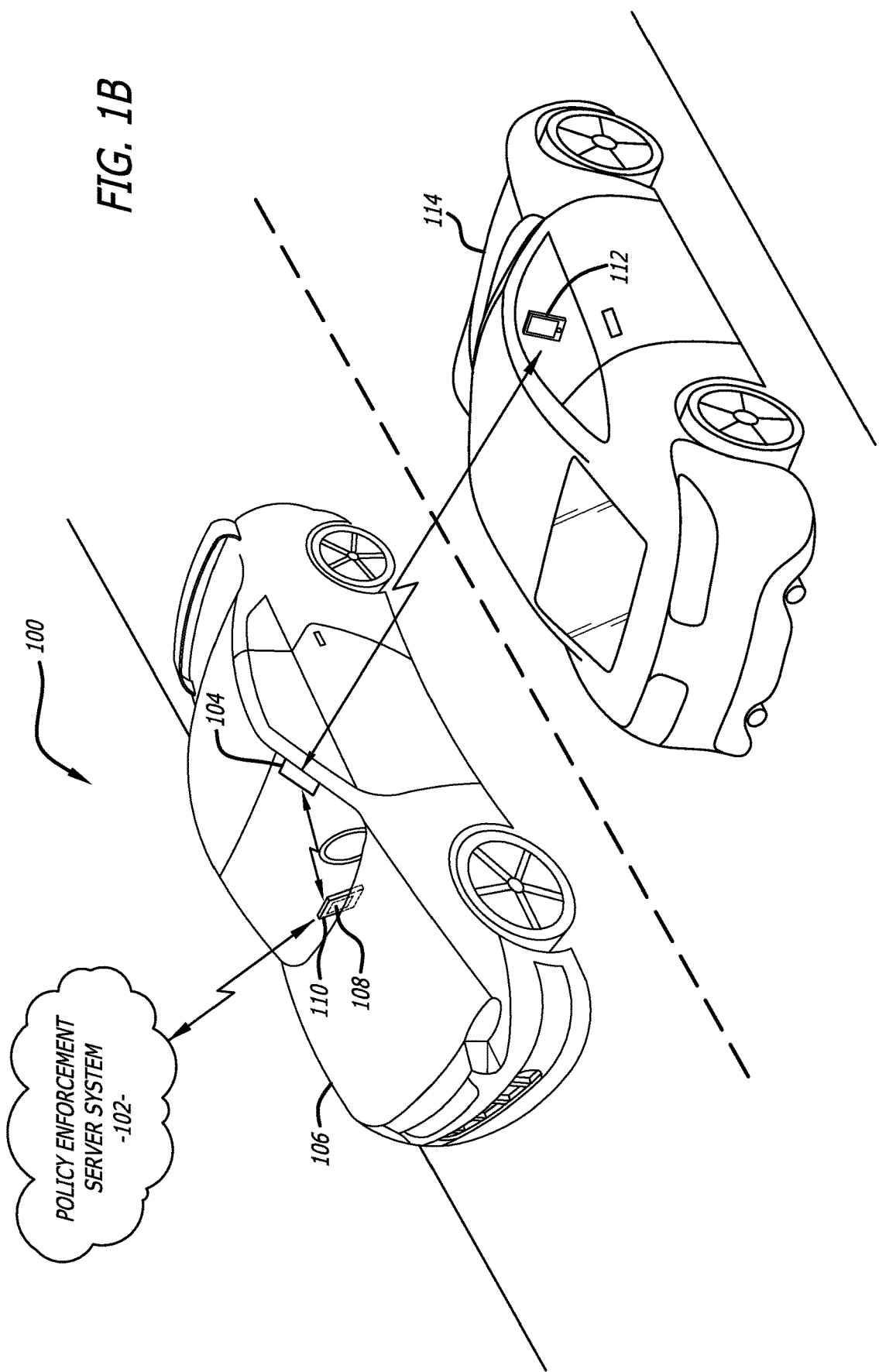
FIG. 1B is a second exemplary illustration of the policy enforcement system of FIG. 1A interacting with a network device of a second vehicle.

Referring now to FIG. 1B, a second exemplary illustration of the policy enforcement system of FIG. 1A interacting with a network device of a second vehicle is shown. FIG. 1B provides a similar illustration as FIG. 1A in which the policy enforcement system 100 is deployed in connection with the vehicle 106. However, FIG. 1B further illustrates that the policy enforcement system 100 may interact with network devices located in other vehicles (e.g., the network device 112 located within the vehicle 114). As discussed above, each network device may transmit a signal at regular time intervals including certain information, such as a Universally Unique Identifier (UUID), that enables logic included within the wireless transceiver ("wireless transceiver logic") to identify each network device. In some embodiments, the wireless transceiver logic may be programmed into an integrated circuit, as seen in FIG. 2. As will be discussed below with respect to FIGS. 4-5B, the wireless transceiver may form one or more lists identifying detected network devices in order to assess the content of the list(s) against a set of policies and/or driver/vehicle guidelines (discussed below), and, when applicable, transmit an alert to an administrator. Although not illustrated, an instance of the application 108 may be installed on the network device 112.

Figure 1C:
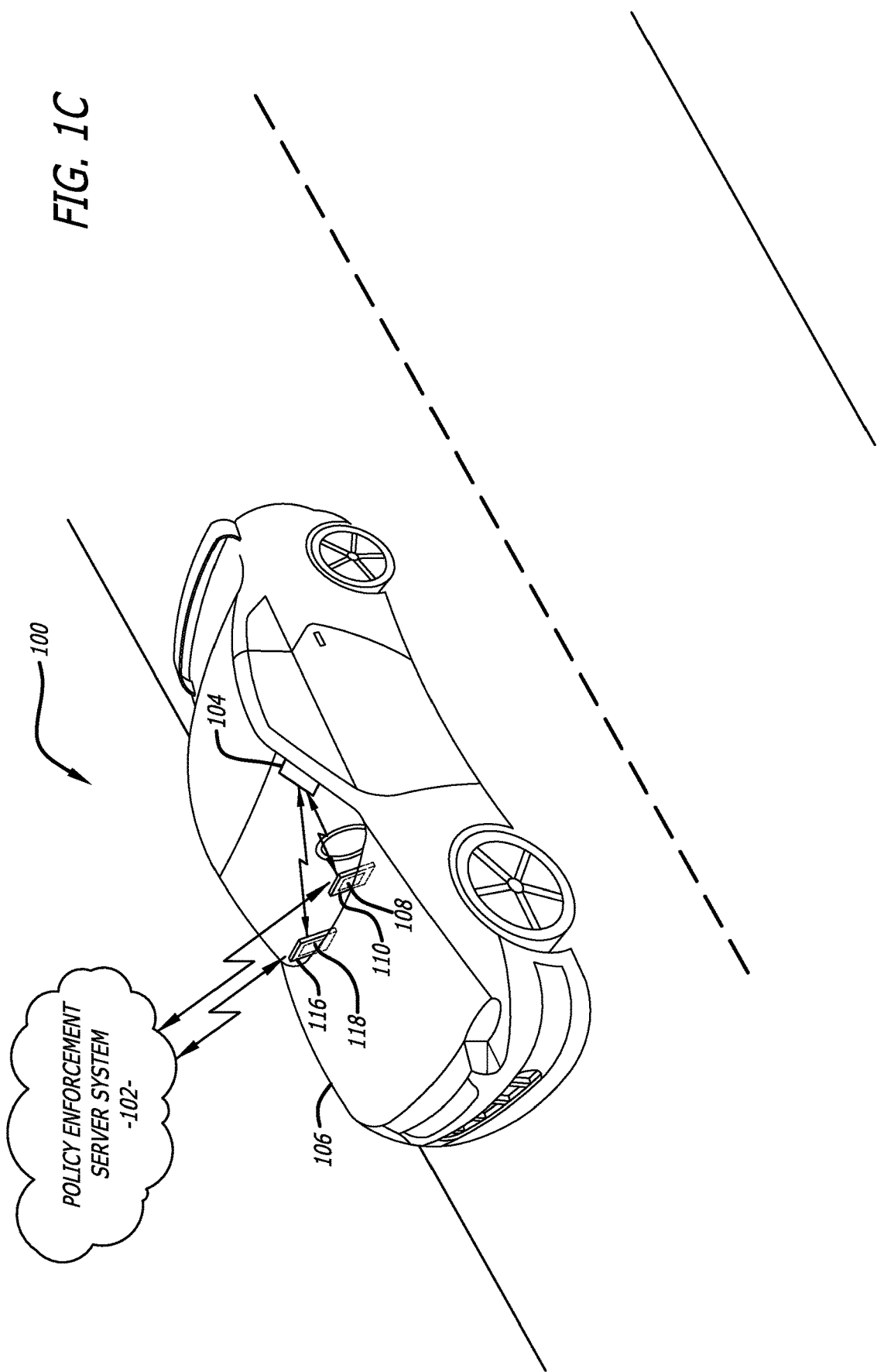
FIG. 1C is a third exemplary illustration of the policy enforcement system of FIG. 1A wherein two network devices are located within the first vehicle.

Referring to FIG. 1C, a third exemplary illustration of the policy enforcement system of FIG. 1A wherein two network devices are located within the first vehicle is shown. FIG. 1C provides a similar illustration as FIG. 1A in which the policy enforcement system 100 is deployed in connection with the vehicle 106. However, FIG. 1C further illustrates that the policy enforcement system 100 may interact with multiple network devices located in a single vehicle (e.g., the network devices 110, 118 located within the vehicle 106). In various embodiments, a first set of policies may be applied by each application to their corresponding network devices, different sets of policies may be applied to each network device, or a first set of policies may be applied to only one of the multiple devices. As will be discussed in detail below, each instance of the policy enforcement application (e.g., application 108 and 116, which correspond to the policy enforcement application 600 of FIG. 6) will attempt to connect to and communicate with wireless transceiver 104. Based on information received from the wireless transceiver 104, each instance of the policy enforcement application will determine whether its corresponding network device is closest to the wireless transceiver 104, and when its corresponding network device is closest to the wireless transceiver 104, the application will apply a set of policies to restrict and/or limit the functionality of its network device. In other embodiments, each instance of the policy enforcement application will determine whether its corresponding network device is within a predetermined distance to the wireless transceiver 104 (e.g., based on the corresponding RSSI value), and when its corresponding network device is within the predetermined distance to the wireless transceiver 104, the application will apply a set of policies to restrict and/or limit the functionality of its network device.

In some embodiments, a set of policies may only be applied to the network device determined to be closest in proximity to the wireless transceiver 104, i.e., with the expectation that such network device is being handled by the driver (i.e., as is seen in FIGS. 1A-1C, the wireless transceiver 104 is coupled to the interior of the vehicle on the side of the windshield opposite a front passenger seat). In alternative embodiments, a first set of policies may be applied to all network devices determined with be located within the vehicle 106 in order to remove all distractions. Predetermined rules or configuration settings may be used to determine which of the above applies. For example, a first rule set (e.g., driver/vehicle guidelines) may be used by the policy enforcement system 100 when deployed in connection with a truck or van within a commercial fleet (e.g., apply a set of policies to all network devices having an instance of the policy enforcement application installed thereon). As an additional example, a second rule set may be used by the policy enforcement system 100 when deployed in connection with an individual's personal vehicle (e.g., apply a set of policies only to the network device determined to be located closest to the wireless transceiver, i.e., the network device of the driver).

Referring to FIG. 2, an exemplary block diagram of a wireless transceiver of the policy enforcement system of FIG. 1A is shown. The wireless transceiver 104 (as referenced above, also referred to as a "network device sensor") is shown as having the shape of an ellipse. The wireless transceiver 104 may have a height (e.g., constant in some embodiments but may vary in others), in order to accommodate components housed within. It should be understood that the wireless transceiver 104 may take many different shapes and the disclosure is not intended to be limited to the wireless transceiver 104 having the shape of an ellipse. Examples of other shapes include, but are not limited or restricted to, a triangle, a rectangle, a rhombus or a trapezoid. Further, the wireless transceiver 104 may be, for example, predominantly spherical and include a flat edge configured for attachment to a surface, such as an interior panel of a vehicle. In some embodiments, the wireless transceiver 104 may include a housing, which is made entirely or partially of a hardened material (e.g., hardened plastic, metal, glass, composite or any combination thereof) that protects circuitry and other components within the housing, namely an integrated circuit 200, an optional vibration sensor 202, an accelerometer 204, a communications interface 206 and a battery 208. The communication interface 206, under control by a communication interface logic (not shown), enables communications with external network devices, such as network devices and/or a cloud server.

According to one embodiment of the disclosure, the communication interface 206 may be implemented with one or more radio units for supporting wireless communications with other electronic devices. Additionally, or in the alternative, the communication interface 206 may be implemented as a physical interface including one or more ports for wired connectors. The communication interface logic may perform operations to cause the receipt and transmission of electronic data via the communication interface 206.

The integrated circuit 200 may be configured to perform operations including receiving and parsing signals from network devices (e.g., to identify each network device and determine the RSSI of each signal) and performing scans for network devices to determine network devices detected during multiple scans. In one embodiment, a scan may refer to the transceiver 104 initiating a time period ("scan time period") during which it receives and records transmissions from network devices for further analysis, where a transmission may be referred to as a beacon that are automatically transmitted by a network device at regular intervals. A transmission may include certain information such as a device address (such as a UUID or other identifier), an RSSI value, and data (which, in some embodiments, may be an advertisement packet). The scan may conclude when the transceiver 104 no longer records transmissions that were received (or otherwise detected) for the further analysis.

In one embodiment, the further analysis may include "detecting" network devices that are within a predetermined proximity to the transceiver 104 based on the RSSI value of the received and recorded transmission during the scan. For example, the integrated circuit 200 of the transceiver 104 may perform operations including comparing the RSSI of a transmission from each network device against a guideline threshold (where satisfying the comparison indicates detection of a network device within the predetermined proximity) and transmitting an alert to the policy enforcement server system 102 of FIGS. 1A-1C when a plurality of network devices are detected (or when the number of network devices is above a threshold number, which may be based on the number of network devices expected in the vehicle at a given time based on known expected routes, expected drivers and expected passengers). The integrated circuit may also perform operations that cause the communication interface 206 to transmit sensory data to the application 108 and/or the policy enforcement server system 102 (in embodiments in which the policy enforcement server system 102 is in communication with wireless transceiver 104). Additional operations performed by the integrated circuit 200 included in the further analysis are discussed throughout, wherein the integrated circuit 200 may be referred to as "wireless transceiver logic" in some embodiments.

In embodiments in which the wireless transceiver 104 includes the vibration sensor 202, the vibration sensor 202 is configured to perform operations including detecting and recording vibration. As will be discussed below, the vibration sensor 202 may detect vibration of a vehicle and the wireless transceiver 104 may transmit a signal to a network device (e.g., the network device 110) to be parsed and analyzed by the application 108. The application 108 may then utilize the vibration data in determining whether to implement, or withdraw implementation of, a set of policies with respect to the network device. The accelerometer 204 performs operations including detecting and recording acceleration (e.g., movement). As will be discussed below, the accelerometer 204 may detect acceleration of a vehicle and the wireless transceiver 104 may transmit a signal to a network device (e.g., the network device 110) to be parsed and analyzed by the application 108. The application 108 may then utilize the acceleration data ("movement data") in determining whether to implement, or withdraw implementation of, a set of policies with respect to the network device.

In embodiments in which the vibration sensor 202 is not included in the wireless transceiver 104, the wireless transceiver 104 may obtain sensory data from the accelerometer 204 and perform operations, via logic, that simulate the functionality of a vibration sensor. This functionality is simulated via one of several available operating modes of the accelerometer 204 by utilizing a method that recognizes both positive and negative acceleration, and generates an interrupt when the value is greater than a predetermined threshold. The value of acceleration represents movement in any of the X, Y, or Z directions, and/or any combination thereof. Each interrupt lasts for a calculated length of time using the formula: 1/ODR, with Output Data Rate (ODR) representing a predetermined frequency, the value of which is configured and stored in control registers.

In some embodiments, the movement/vibration data may be a byte within a signal transmitted from the wireless transceiver to the network device at specified time intervals (e.g., every 10, 15 or 30 seconds). In some embodiments, the byte comprises a series of bits, with each bit indicating a movement/vibration status for each time interval. As one illustrative example, the signal may include the following series of bits as shown and described in the following Table 1.

TABLE 1

| Interval | Bit series | Status of last interval |
| --- | --- | --- |
| $time_0$ | 0000 0001 | movement/vibration detected |
| $time_1$ | 0000 0011 | movement/vibration detected |
| $time_2$ | 0000 0111 | movement/vibration detected |
| $time_3$ | 0000 1110 | no detection |
| $time_4$ | 0001 1101 | movement/vibration detected |
| $time_5$ | 0011 1011 | movement/vibration detected |
| $time_6$ | 0111 0111 | movement/vibration detected |
| $time_7$ | 1110 1111 | movement/vibration detected |

Each interval may comprise 10 seconds and the delay time for withdrawing implementation of the set of policies may be 80 seconds. Therefore, once the application detects movement and implements the set of policies, the application will monitor the bit series received in the signal from the wireless transceiver and continue implementation of the policy until either (1) the bit series reads "0000 0000" (i.e., no movement for 80 seconds), or (2) the application no longer detects the presence of the wireless transceiver. In one embodiment, the status of "no detection" at $time_3$ may be a result of the vehicle stopping at a traffic sign.

As discussed herein, withdrawal of the implementation of the set of policies refers to the application of the policy enforcement system returning the network device to its unrestricted or unlimited operating state (e.g., full access to all applications is provided, or at least the same access is provided that was available prior to implementation of the set of policies).

In some embodiments, the battery 208 may be a single use battery such that upon depletion of its energy store, the wireless transceiver 104 may be disposed of. In alternative embodiments, the battery 208 may be one of the following rechargeable battery types, nickel cadmium (NiCd), Nickel-Metal Hydride (NiMH), Lithium Ion (Li-ion), Lithium Ion Polymer (Li-ion polymer), etc.

III. General Methodologies—Policy Enforcement System

Referring to FIG. 3, a flowchart illustrating an exemplary process of implementing and monitoring a set of policies by a policy enforcement application of the policy enforcement system of FIG. 1A is shown. Each block illustrated in FIG. 3 represents an operation performed in the method 300 of applying a set of policies to a network device and monitoring the network device according to at least a subset of the set of policies. In some embodiments, a set of policies may include multiple subsets (i.e., less than the whole). In some such embodiments, the multiple subsets may include a first subset that is directed to restricting the functionality of the network device and a second subset that is directed to monitoring instructions and applicable thresholds. For example, implementation of the first subset of policies may result in removal of icons from the display screen of a mobile device (see FIGS. 5A-5B) in order to restrict functionality of the mobile device. Additionally, implementation of the second subset of policies may cause logic associated with the policy enforcement system (i.e., an application installed on a network device) to monitor certain aspects (e.g., motion via a gyroscope and/or accelerometer).

Referring to the diagram of FIG. 3, in one embodiment, it is assumed that prior to the beginning of the method 300, the application of the policy enforcement system has been installed on a network device (e.g., a mobile device) and a network device sensor (e.g., a wireless transceiver) has been installed or placed within a vehicle. Thus, the method 300 commences when the application processing on the network device detects (i) movement above a predetermined speed threshold (e.g., 5, 10, 15 mph), and (ii) the presence of the wireless transceiver (block 302). In some embodiments, the application obtains sensory data from an accelerometer of the network device in order to determine movement (i.e., acceleration) or from a vibration sensor. Alternatively, or in addition to, the application may obtain sensory data from a GPS unit of the network device in order to determine movement. The presence of the wireless transceiver may be detected based on a signal transmitted from the wireless transceiver in response to a beacon signal transmitted by the network device. The application and wireless transceiver logic then engage in communication in order to determine communication methods and protocol (e.g., a frequency on which to communicate as discussed below). In some embodiments the sensory data obtained from the network device sensor is coupled with the sensory data obtained from the network device to perform a "handshake" that confirms the presence of a wireless transceiver, which prompts the application to implement a set of policies to the network device to restrict and/or limit functionality of the network device. As used herein, the term "handshake" refers to the exchange of information between two devices in order to authenticate one or both of the devices.

In response to detecting (i) movement above a predetermined speed threshold, and (ii) the presence of the wireless transceiver, the application determines whether the network device on which the application is processing is the closest network device to the wireless transceiver (304). FIG. 3 illustrates the flow of method 300 when the application determines the network device on which the application is processing is the closest network device to the wireless transceiver.

Responsive to determining the network device on which the application is processing is the closest network device to the wireless transceiver, the application implements a set of policies, wherein at least a first subset of the policies may restrict or limit functionality of the network device (block 306). As referenced above, the application may perform operations that result in limiting or restricting the functionality of the network device, which may include removing icons from a display screen of the network device as indicated by the first subset of policies. For example, as seen below in FIGS. 5A-5B, icons associated with certain applications running on the network device may be removed to prevent use of the application (e.g., mail, messaging, camera, etc.). Other methods of restricting use of the network device have also been contemplated with examples including, but not limited or restricted to, shading out the icons, shrinking the icons (e.g., altering icons appearance and preventing the opening of the application), disabling and/or delaying notifications, disabling and/or delaying receipt or transmission of data, etc. Other examples of restricting or limiting use of the network device are discussed above and equally applicable in this embodiment.

The method 300 then continues with additional operations that may be performed in parallel or in a concurrent manner (i.e., at least partially overlapping in time); however, there is no such requirement. In further response to detecting (i) movement above a predetermined speed threshold, and (ii) the presence of the wireless transceiver, the application causes the transmission of a signal to the wireless transceiver instructing the wireless transceiver to scan for other network devices (block 308). The scan for other network devices by the wireless transceiver may be done to determine the number of network devices within the vehicle (or within a particular physical region surrounding the wireless transceiver in other non-vehicle deployments). For instance, certain vehicle/driver guidelines may set forth an allowed number of network devices within a vehicle, potentially at certain times of the day, wherein an alert may be transmitted when the vehicle/driver guideline is violated. In other instances, one or more of the components of the policy enforcement system may trigger certain policies or alerts based on what network devices are detected, optionally depending on the time. For example, when the policy enforcement system is deployed within a set of corporate vehicles, as each network device's Universally Unique Identifier (UUID) is received by the wireless transceiver, wireless transceiver logic may determine whether any network devices detected are associated with employees, and whether the presence of multiple employees (or otherwise other network devices) is permitted under the applicable vehicle/driver guidelines and/or set of policies to be implemented.

Additionally, in further response to detecting (i) movement above a predetermined speed threshold, and (ii) the presence of the wireless transceiver, the application implements a first subset of policies to the network device thereby restricting or limiting functionality of the network device, as discussed above (block 310). Additionally, the application may monitor sensory data and apply a second subset of policies to the sensory data.

Following the implementation of the second subset of policies and responsive to determining that monitored sensory data violates one or more policies of the second subset of policies, the application causes performance of operations resulting in the transmission of an alert or signal to administrator (block 312). For instance, the application may cause transmission of the alert or signal to the policy enforcement server system 102 of FIG. 1A, which may in turn transmit an alert or signal to an administrator. Additionally, the alert or signal may be reviewed as part of a dashboard display (not shown).

Figure 4:
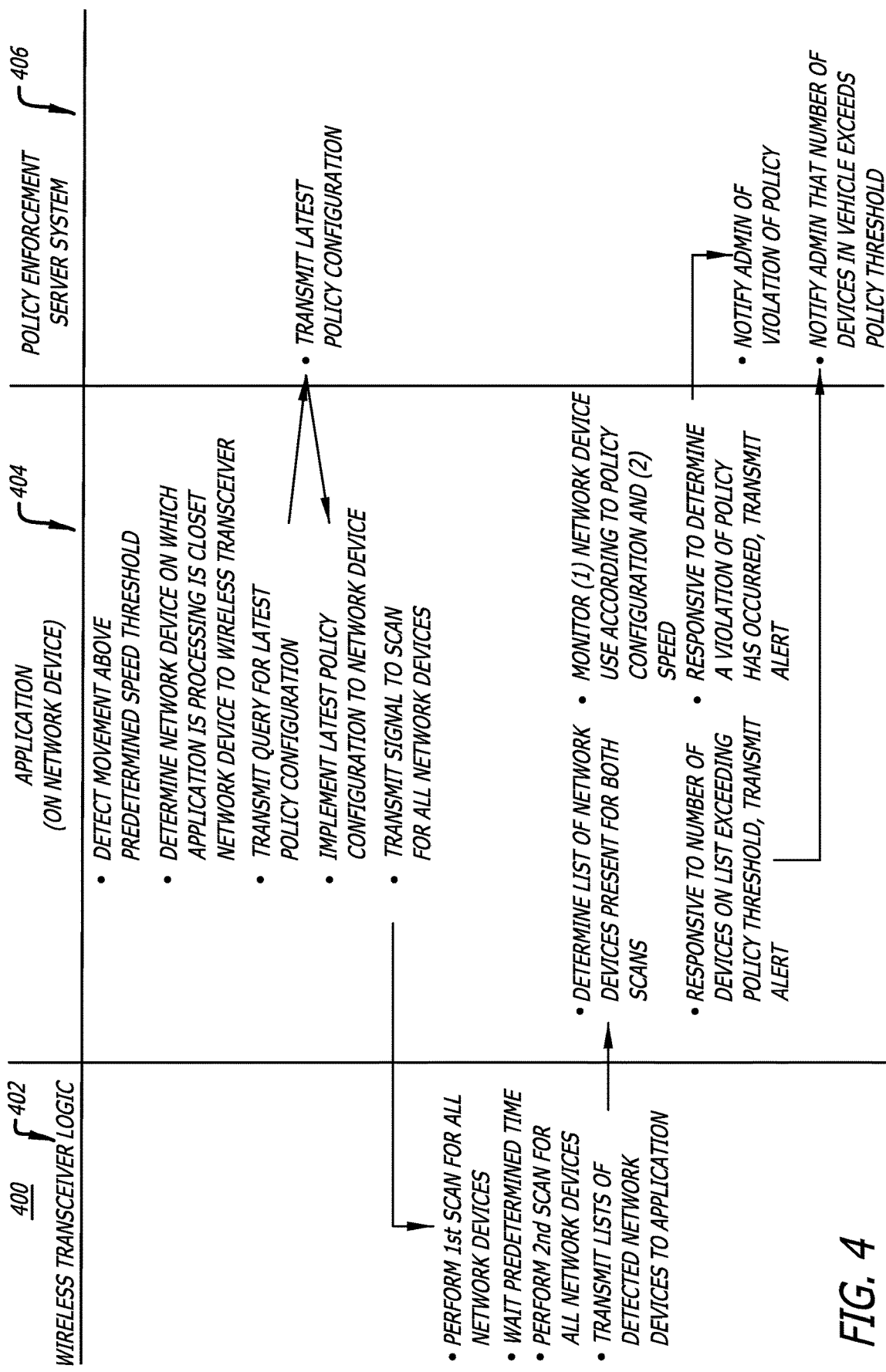
FIG. 4 is an operational flow diagram illustrating operations performed in the process of FIG. 3.

Referring now to FIG. 4, an operational flow diagram illustrating operations performed in the process of FIG. 3 is shown. Specifically, the operational flow diagram includes three columns, one representing each main component of the policy enforcement system: the wireless transceiver logic (column 402); the application (column 404); and the policy enforcement server system (column 406). Each bullet point within a column represents an operation (or operations) performed by the component corresponding to the column. Further, each arrow indicates the transmission of data from a first component to a second component. In some embodiments, the assumptions discussed above with respect to FIG. 3 are equally applicable with respect to FIG. 4.

The operational flow diagram illustrates one embodiment of a process of applying and monitoring a set of policies by the policy enforcement system of FIG. 1A may begin when the application 108 detects movement above a predetermined threshold. Responsive to the detection of movement above the predetermined threshold, the application 108 determines whether the network device on which it is processing is the closest network device to the wireless transceiver 104.

When the application 108 determines whether the network device on which it is processing is the closest network device to the wireless transceiver 104, the application 108 may then transmit a query to the policy enforcement server system 102 for the latest policy configuration (i.e., set of policies to implement). As an alternative, the application 108 may retrieve and utilize the latest received policy configuration from a policy configuration data store, not shown, that is either stored locally on a network device on which the application 108 is operating, i.e., the network device 110, or is otherwise accessible to the application 108.

Following receipt of the request from the application 108, the policy enforcement server system 102 transmits the latest policy configuration to the application 108. In some embodiments, the policy enforcement server system 102 parses the request to identify the network device 110 (and optionally the corresponding user and vehicle, if such data is included in a data store accessible by the policy enforcement server system 102. The policy enforcement server system 102 may then generate a message including the latest policy configuration for transmission.

Following receipt of the message from the policy enforcement server system 102, the application 108, performs several operations which may be in any order. The following operations may also be performed in parallel and include (i) implementing the latest policy configurations with respect to the network device, and (ii) transmitting a signal to the wireless transceiver 104 to be parsed by wireless transceiver logic operating thereon instructing the wireless transceiver logic to perform a scan for additional network devices. Additionally, following the implementation of the latest policy configuration, the application 108 monitors use of the network device according to the latest policy configuration and monitors speed (e.g., of the vehicle 106). Responsive to determining that a violation of the latest policy configuration has occurred, the application 108 may transmit an alert to the policy enforcement server system 102.

Referring to the wireless transceiver 104's receipt of the instructions to scan for additional network devices, the wireless transceiver logic performs a first scan for all network devices (e.g., receives transmission (beacons) as discussed below) and records identifiers of all detected network devices (and optionally RSSI values of the beacons). The wireless transceiver logic then waits a predetermined time before performing a second scan and recording identifiers of all detected network devices. Following completion of the first and second scans, the records of detected network devices (i.e., a first list and a second list), are transmitted to the application 108, which compares the first list and the second list to determine network devices detected during each scan (i.e., present on both lists). Responsive to the number of network devices detected during both scans exceeding a policy threshold, the application 108 causes transmission of an alert to the policy enforcement server system 102. It should be noted that the determination as to whether a detected number of network devices by the wireless transceiver logic may be based on driver/vehicle guidelines. It should be noted that in some embodiments, the comparison of the lists may be performed by the wireless transceiver logic. Additionally, the first list may be transmitted to the application 108 following the completion of the first scan, there is no requirement that transmission of the first list be performed after completion of the second scan. Additionally, the disclosure is not limited to only two scans. Instead, a plurality of scans may be performed, where additional scans may improve reporting accuracy of detected network devices.

Referring again to column 406 and operations of the policy enforcement server system 102, upon receiving either an alert indicating a policy violation from the application 108 and/or an alert indicating the number of detected network devices during both scans of the wireless transceiver logic, the policy enforcement server system 102 may notify an administrator. Notice to the administrator may be through a message such as a short message service (SMS) message, a multimedia message service (MMS), email, etc. Alternatively, or in addition, notice to the administrator may be provided via (i) a dashboard and/or (ii) a software application operation on a network device (e.g., an "app" operating on a mobile phone or a tablet).

Figure 5A:
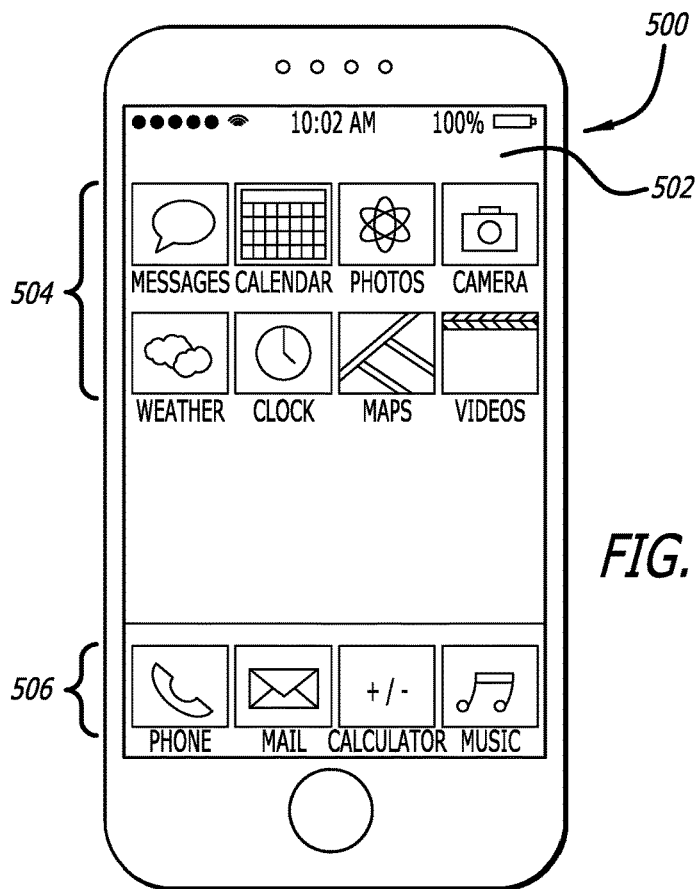
FIG. 5A is an illustration of a network device prior to the implementation of a set of policies by a policy enforcement application of the policy enforcement system of FIG. 1A.

Referring to FIG. 5A, an illustration of a network device prior to the implementation of a set of policies by the policy enforcement system of FIG. 1A is shown. FIG. 5A illustrates a network device 500 (e.g., a mobile device) in a first state wherein a display screen 502 has rendered thereon a set of home screen icons 504 and a set of toolbar icons 506. The first state is one in which a set of policies directed at restricting or limiting functionality of the mobile device 500 has not been implemented. For instance, the mobile device 500 may be in the first state when not within a vehicle.

Figure 5B:
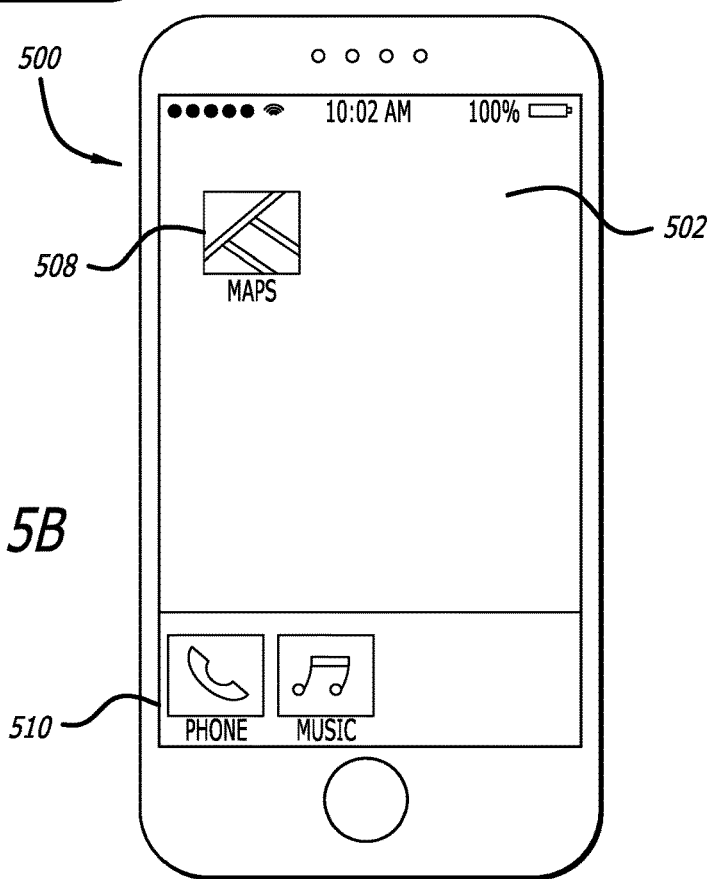
FIG. 5B is an illustration of the network device of FIG. 5A following the implementation of a set of policies by the policy enforcement application of the policy enforcement system of FIG. 1A.

Referring to FIG. 5B, an illustration of the network device of FIG. 5A following the implementation of a set of policies a by the policy enforcement system of FIG. 1A is shown. FIG. 5B illustrates the mobile device 500 in a second state wherein the display screen 502 has rendered thereon a modified set of home screen icons 508 and a modified set of toolbar icons 510. The second state is one in which a set of policies directed at restricting or limiting functionality of the mobile device 500 has been implemented resulting in the removal of predetermined icons from the display screen 502. As referenced above, the set of policies are directed to restricting or limiting functionality of a mobile device, which may include, for example, restricting use of certain applications on the mobile device in order to reduce distractions (e.g., weather, clock, messages, calendar, photos, camera, videos, etc.). As discussed above, the set of policies may be implemented by an application that is a component of the policy enforcement system and installed on the mobile device 500. Specifically, the set of policies may be implemented to remove icons from a mobile device's display screen when the mobile device is within a moving vehicle, and more specifically, the mobile device is determined by the policy enforcement system to be the driver's mobile device (or at least the closest mobile device to the driver). In some embodiments, the set of policies may be applied by the policy enforcement system of FIG. 1A to a plurality of networks devices, such as the network devices within a region incorporating the interior of a vehicle.

IV. Logical Representation— Policy Enforcement Application

Figure 6:
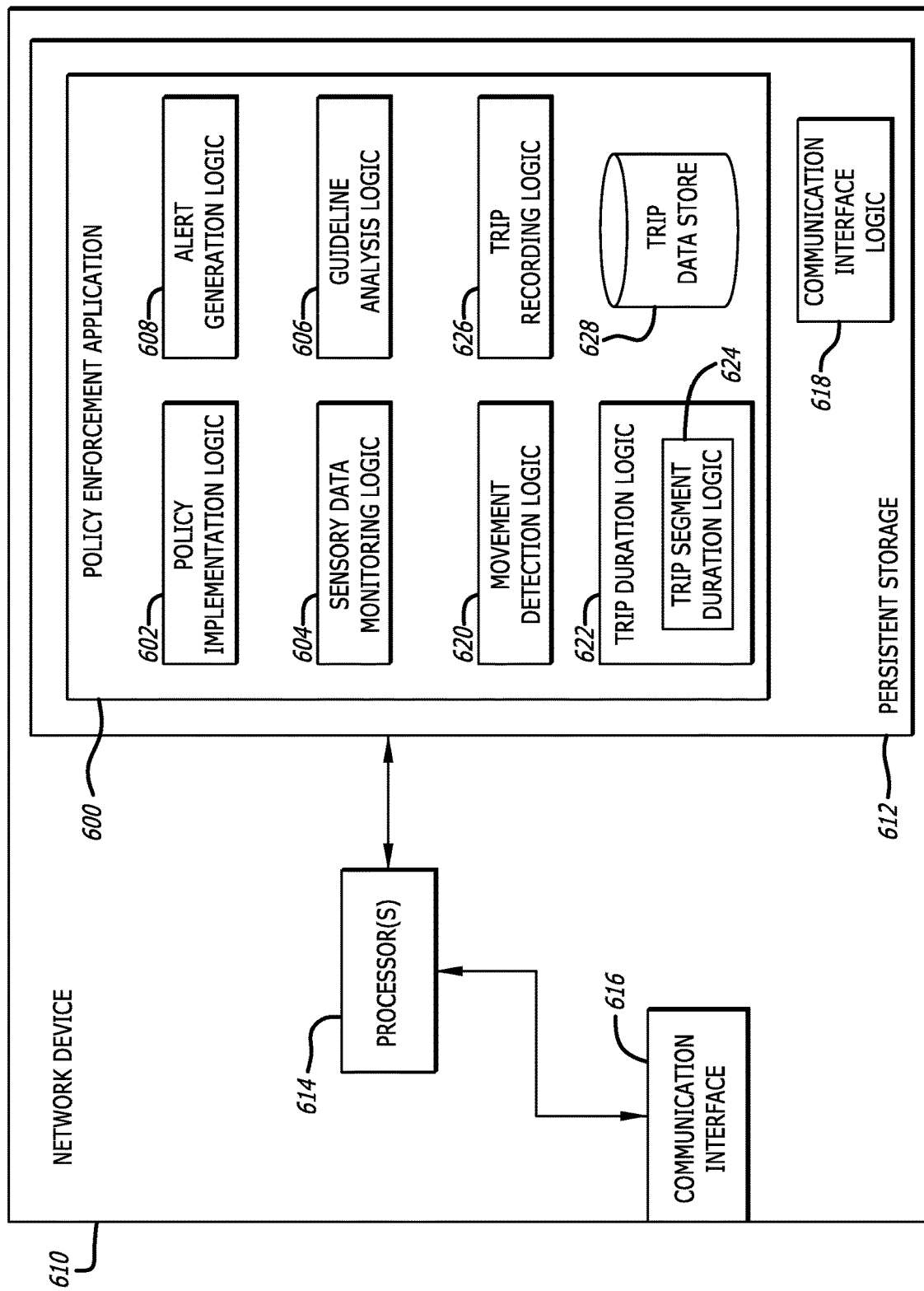
FIG. 6 is an exemplary embodiment of a logical representation of the policy enforcement application of the policy enforcement system of FIG. 1A.

Referring now to FIG. 6, an exemplary embodiment of a logical representation of the policy enforcement application of the policy enforcement system of FIG. 1A is shown. The policy enforcement system application 600 (which may be referred to throughout the disclosure as "the application"), in one embodiment, may be stored on a non-transitory computer-readable storage medium of a network device that includes a housing, which is made entirely or partially of a hardened material (e.g., hardened plastic, metal, glass, composite or any combination thereof) that protects the circuitry within the housing, namely one or more processor(s) 614 that are coupled to a communication interface 616 via a first transmission medium. The communication interface 616, under control by a communication interface logic 618, enables communications with external network devices, such as the wireless transceiver 104 of FIGS. 1A-1C. According to one embodiment of the disclosure, the communication interface 616 may be implemented as a physical interface including one or more ports for wired connectors. Additionally, or in the alternative, the communication interface 616 may be implemented with one or more radio units for supporting wireless communications with other electronic devices. The communication interface logic 618 may perform operations of receiving and transmitting electronic data via the communication interface 616 to enable communications between the policy enforcement system application 600 and network devices via a network (e.g., the internet) and/or cloud computing services.

The processor(s) 614 are further coupled to a persistent storage 612 via a second transmission medium. According to one embodiment of the disclosure, the policy enforcement application 600 may be stored in the persistent storage 612 and include some or all of the following components: a policy implementation logic 602, a sensory data monitoring logic 604, a guideline analysis logic 606, an alert generation logic 608, a movement detection logic 620, a trip duration logic 622 including a trip segment duration logic 624, a trip recording logic 626 and a trip data store 628. The communication interface logic 618 may also be stored in the persistent storage 612. Of course, when implemented as hardware, one or more of these logic units could be implemented separately from each other. In addition, the following data stores, although not illustrated, may be stored locally with respect to the network device 610 and accessible to the policy enforcement application 600: a driver/vehicle guideline data store (DS), a policy configuration DS, a sensory data DS and an alert DS. In some embodiments, one or more of the data stores may be stored remotely and accessible to the policy enforcement application 600. Of course, one or more of the data stores may be implemented together.

According to some embodiments, the policy implementation logic 602 may, upon execution by the processors 614, perform or cause performance of operations including receiving policy configurations from the enforcement policy server system and implementing a set of policies (e.g., provided in the policy configuration), which may include restricting or limiting certain functionality of the network device 610. Various methods or manners of restricting or limiting functionality are discussed above. When a policy violation occurs, the policy implementation logic 602 may provide a signal or other indication to the alert generation logic 608, which is configured to generate alerts. Additionally, the policy enforcement logic 602 may perform operations to initiate a policy release counter and determine whether the policy release counter satisfies a counting requirement. In some embodiments, initiating the policy release counter and satisfying the counting requirement includes decrementing from a set value to zero. In alternative embodiments, initiating the policy release counter and satisfying the counting requirement includes incrementing a value from zero to a set value.

The sensory data monitoring logic 604 may, upon execution by the processors 614, perform or cause performance of operations including monitoring the handling of and operations performed to/by the network device 610, which may be according to the implemented set of policies and/or driver/vehicle guidelines. The sensory data monitoring logic 604 may provide detected or monitored data to the policy implementation logic 602 for analysis against the implemented set of policies.

The guideline analysis logic 606 may, upon execution by the processors 614, perform or cause performance of operations including analyzing data that is detected or monitored by the sensory data monitoring logic 604 against a set of predetermined driver/vehicle guidelines. The guideline analysis logic 606 may provide a signal or other indication to the alert generation logic 608 when a guideline violation has occurred.

The alert generation logic 608 may, upon execution by the processors 614, perform or cause performance of operations including generating alerts and/or messages to be transmitted to the wireless transceiver and/or the policy enforcement server system, which may in turn generate an alert to be provided to an administrator as discussed above. Additionally, in some embodiments, the policy enforcement server system may merely forward the alert from the alert generation logic 608 to the administrator (or others registered to receive alerts).

The movement detection logic 620 may, upon execution by the processors 614, perform or cause performance of operations including obtaining data that indicates a speed that the network device 610 is traveling and performs a comparison between the data that indicates a speed and a predetermined speed threshold. As one example, the data that indicates a speed may be data from a GPS unit of the network device 610. In some embodiments, the predetermined speed threshold may be 5 miles per hour (mph). In other embodiments, the predetermined speed threshold may be 15 mph. However, it should be understood that these are merely illustrative examples and that other thresholds may be utilized. Further, the predetermined speed threshold may be altered (e.g., through updates to the policy enforcement application 600).

The trip duration logic 622 may include a sub-logic module, the trip segment duration logic 624, which each may, upon execution of the processors 614, perform or cause performance of operations including obtaining data pertaining to the movement of the network device (and the transceiver) from the movement detection logic 620 and determining, based on such data, when a trip has begun, when the trip has ended and when a trip segment occurred (started and stopped). The trip duration logic 622 may provide an indication to the trip recording logic 626 to begin recording a trip (e.g., record the start location and a date-timestamp) as well as driver (or network device) identifier information. In some embodiments, an identifier for the vehicle performing the trip and/or an identifier for wireless transceiver are also included in the indication to the trip recording logic. In some instances, the vehicle performing the trip and/or an identifier for wireless transceiver are provided in lieu of the driver and/or network device identifier. The trip duration logic 622 and the trip segment duration logic 624 may perform operations as discussed below with respect to FIGS. 7-10B. For example, the trip duration logic 622 may perform operations to decrement a trip duration counter as discussed below.

The trip recording logic 626 may, upon execution of the processors 614, perform or cause performance of operations including recording information pertaining to a trip and each of the one or more trip segments comprising the trip in, for example, the trip data store 628. Examples of particulars of the trip that may be recorded by the trip recording logic 626 include, but are not limited or restricted to, a driver name or identifier, a network device identifier, a vehicle identifier, a wireless transceiver identifier, a trip identifier, a trip segment identifier, a date-timestamp, a first (beginning) location, a second (end) location, a total time and/or a total distance. In some embodiments, the location information may be obtained by the GPS unit of the network device. Operations associated with recording of a trip and its trip segments are discussed below with respect to FIGS. 7-10B.

As not all operations performed by the policy enforcement application 600 have been enumerated and discussed with respect to FIG. 6, it should be understood that the disclosure above regarding operations performed by the policy enforcement application 600 may be performed by one or more of the logic modules illustrated in FIG. 6.

V. Rapid Release of Policy and Trip Continuance

As described above, a policy enforcement application ("application") may be installed and operating on a network device that is within a moving vehicle. In such instances, the application may implement a set of policies to restrict the use of certain functionalities of the network device thereby preventing a driver from utilizing the network device for at least certain tasks during operation of the vehicle. As also discussed above, the application may monitor sensory data of the network device such that when a policy is violated (e.g., the driver attempts to utilize the network device), an alert may be generated and transmitted to an administrator. One illustrative example of an instance when such technology may be advantageous is when the driver is a company employee that drives a corporate vehicle as part of his/her job responsibilities.

As further noted, the duration of the implementation of the set of policies may be based on detection of the network device traveling at least at (which includes above) a speed threshold and/or movement of the transceiver. In particular, the set of policies may continue to be implemented during various stops made by the vehicle in order to ensure that policies are maintained while the vehicle is still being operated (e.g., during stops for traffic lights, traffic signs or general start-and-stop traffic).

However, there are certain situations in which there is a need for a rapid release of the set of policies to enable the driver to perform certain functions. As one illustrative example, the policy enforcement application may be installed and operating on the network device of a postal delivery agent, where the agent's job often comprises numerous short periods of driving in between numerous stops to deliver packages or other items. As a result of the agent's job, there is a need to rapidly release the set of policies implemented on the agent's network device in order to scan a barcode of package to confirm delivery, obtain signatures for certain packages, capture a picture for delivery confirmation, etc.

Similarly, the agent's employer may desire to monitor the agent's driving and obtain a log of the agent's stops during his/her shift. One advantage to monitoring and logging the agent's driving and stops may be to provide evidence that the agent stopped at a particular location (e.g., to deliver or attempt to deliver a package). Logging each start and stop as an individual trip is one embodiment. However, in another embodiment, it may be advantageous to monitor and log an agent's shift or a portion of the shift as a "trip" for purposes of reporting. As will be discussed below, an administrator may monitor an agent's trips via a dashboard (a graphical user interface). If the administrator were to receive alerts every few moments indicating that an agent has completed a trip (e.g., a delivery was made), the administrator may be quickly become overwhelmed, which would make monitoring trips inefficient. This may especially be the case when there are tens, hundreds, thousands, etc., of agents driving concurrently (at least partially overlapping in time).

For example, an agent may work an eight-hour shift delivering packages where the shift is broken down into two four-hour components with an hour break in between. In such an embodiment, each of the first and second four-hour components may comprise several starts and stops (where a start-stop-start period is referred to below as a "trip segment"). Thus, it may be advantageous to indicate various starts and stops as trip segments and continue the overall trip until there is a stop lasting an extended period of time (e.g., the time corresponding to a policy release counter, discussed below).

The following will describe innovative methods and technologies for (i) rapidly releasing a set of implemented policies to enable the driver to perform certain functions and (ii) the logging of overall trips comprising several trip segments. Further, it should be understood that the term "administrator" may refer to a parent or guardian and the term "agent" may refer to any driver.

a. Rapid Release of Policy

As a precursor to the discussion of the methods 700, 900, 912 and 1000 of FIGS. 7, 9A-9B and 10A-10B, upon detection of the presence of a transceiver, a network device having the policy enforcement application operating thereon attempts to connect to the transceiver. Upon connecting, the transceiver may record the RSSI value of a communication (such as an RSSI request/command) received from the network device. A response communication from the transceiver to the network device may include the RSSI value, which may be referred to therein as the "RSSI value of the network device," where the RSSI value of the network device corresponds to the signal strength of a packet transmitted by the network device to the transceiver, which is indicative of the physical proximity of the network device to the transceiver.

Figure 7:
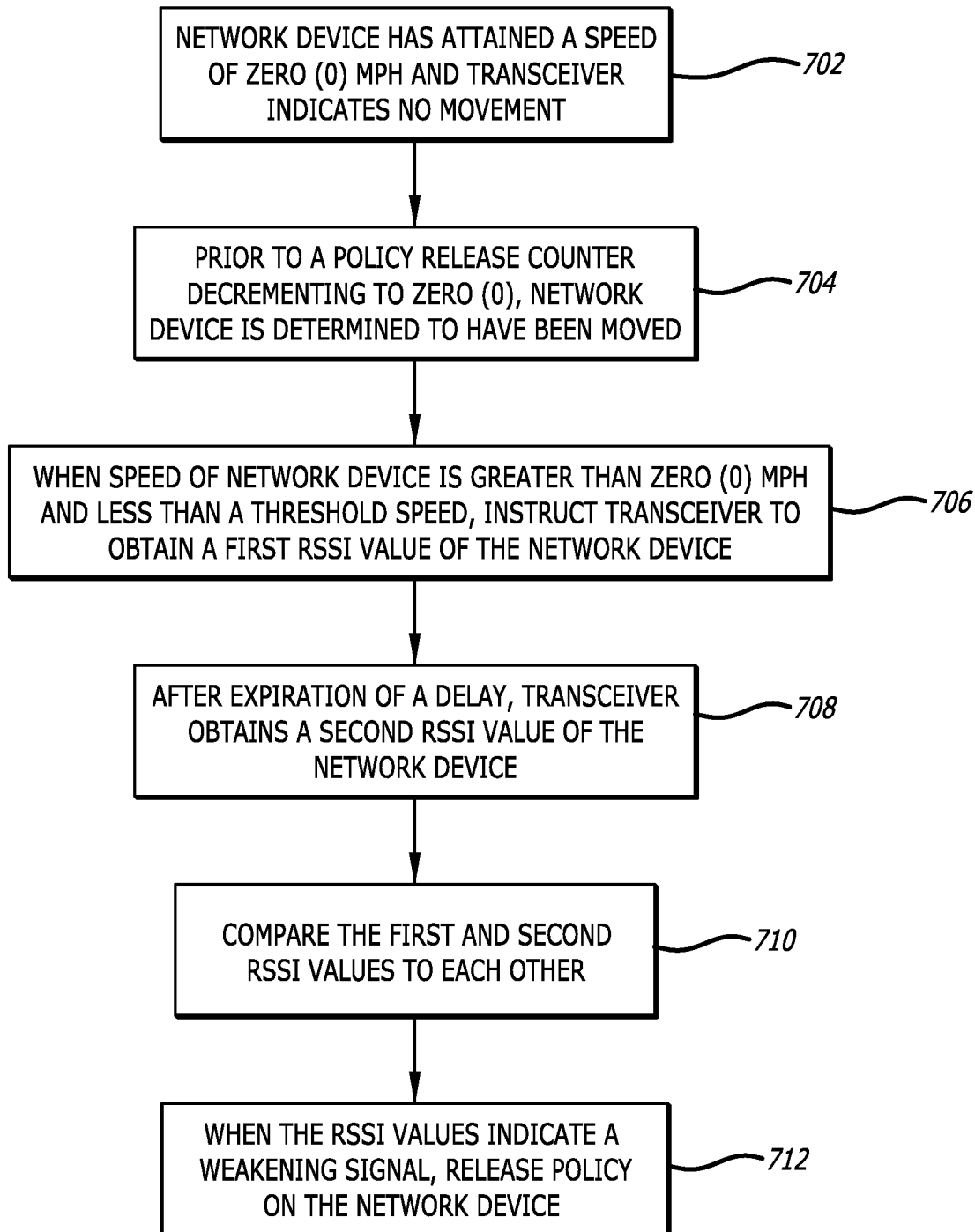
FIG. 7 is a flowchart of an exemplary process of rapidly releasing a set of policies implemented on a network device by the policy enforcement application of FIG. 6.

Referring now to FIG. 7, a flowchart of an exemplary process of rapidly releasing a set of policies implemented on a network device by the policy enforcement application of FIG. 6 is shown in accordance with some embodiments. Each block illustrated in FIG. 7 represents an operation performed in the method 700 of rapidly releasing a set of policies implemented on a network device by the policy enforcement application. Prior to performance of the operations of the method 700, it may be assumed that a network device having an instance of the policy enforcement application 600 ("the policy enforcement application") operating thereon is located within a vehicle. It may be further assumed that a transceiver, such as the transceiver 104 of FIG. 1, is also located within the vehicle. Specifically, the transceiver may be affixed to an upper left corner, a lower left corner or generally the left side of the vehicle's windshield relative to the driver's perspective. In other embodiments, the transceiver may be affixed to the dashboard behind the steering wheel or otherwise in line with a driver's seat. In yet other examples, the transceiver may be affixed to the ceiling of the vehicle above the steering wheel or the driver's seat.

The method 700 will be discussed from the perspective of the network device, where the operations of method 700 are performed by the policy enforcement application operating on the network device unless otherwise stated. It is further assumed that the network device has exchanged an initial set of messages with the transceiver (e.g., a connection request and an acknowledgement), which serve to at least indicate to the policy enforcement application operating on the network device that the network device may be located within a vehicle.

Prior to performance of the operations of the method 700, it may further be assumed that at least a subset of the operations of the method 300 have been performed such that the policy enforcement application has detected movement above a speed threshold along with the presence of the transceiver and a set of policies have been implemented on the network device. Further, the policy enforcement application includes logic to begin decrementing a policy release counter when it is determined that the network device and transceiver has attained a speed of zero (0) mph, where the policy release counter is a configurable time period (e.g., 30 seconds, 60 seconds, etc.).

Thus, the method 700 commences when the network device and the transceiver are determined to have attained a speed of zero (0) mph (block 702). As discussed above, the transceiver may be determined to have attained a speed of zero (0) mph based on a combination of an acceleration of zero (0) mph and a continuous string of a predetermined number of 0's (e.g., eight). When such is determined, the policy enforcement application begins decrementing a policy release counter, which, as noted above, is a predetermined time period (e.g., 30 seconds, 60 seconds, etc.).

As the policy release counter decrements, the policy enforcement application monitors the movement of the network device. More specifically, the policy enforcement application monitors the X/Y/Z positioning of the network device, where the X/Y/Z positioning corresponds to data obtained from a gyroscope (X/Y/Z position data) and/or data obtained from an accelerometer (acceleration data). As is understood by those skilled in the art, a gyroscope measures the rate at which a device rotates around one or more spatial axes, such as a three-axis gyroscope, which detects rotation values for each of an X-, Y- and Z-axis (referred to as X/Y/Z position data). In some embodiments, the X/Y/Z position data may be represented as values measured in radians per second around the given axis, which may be positive or negative depending on the direction of rotation.

In the situation in which the network device is determined to attain a speed above zero (0) mph prior to the policy release counter decrementing to zero (0), the policy enforcement application ceases decrementing the policy release counter and continues implementation of the set of policies.

The method 700 continues with a determination that, prior to the policy release counter decrementing to zero (0), the network device has been moved (block 704). The determination that the network device has moved may be a result of detecting a change in the rotation value for any of the X-, Y- or Z-axis and/or a change in the acceleration above a predetermined threshold. Following detection of the movement of the network device prior to the policy release counter decrementing to zero (0), the policy enforcement application transmits an instruction to the transceiver to obtain a RSSI value of the network device at a first current time ("first RSSI value") (block 706). As used herein, the term "RSSI value of a network device" corresponds to the signal strength of a packet transmitted by the network device to the transceiver, which is indicative of the physical proximity of the network device to the transceiver. In one embodiment, the transceiver receives the instruction to obtain a RSSI value of the network, parses (or otherwise analyzes) the instruction to obtain the RSSI value of the instruction (which corresponds to the "RSSI value of the network device," and transmits a response to the network device that includes the RSSI of the network device. In some embodiments, obtaining the RSSI value includes extracting the RSSI value from the parsed instruction.

After expiration of a delay, the transceiver obtains a RSSI value of the network device at a second current time ("second RSSI value") (block 708). In some embodiments, the instruction transmitted to the transceiver indicates an instruction to obtain both the first and second RSSI values. In other embodiments, the transceiver may be configured such that upon receipt of the instruction from the network device both the first and second RSSI values are automatically obtained. In yet other embodiments, a second instruction may be transmitted to the transceiver to obtain the second RSSI value. As is discussed above, the first and second RSSI values may be obtained by the transceiver based on a communication received from the network device, where the first and second RSSI values may then be provided to the network device in a response communication.

Following the transceiver obtaining both the first and second RSSI values, the detected RSSI values of the network device are compared (block 710). The RSSI values may be provided to the policy enforcement application for comparison. In some embodiments, the RSSI values may be provided to the network device separately (e.g., directly following the transceiver obtaining the corresponding RSSI value) or combined in a single transmission following the transceiver obtaining the second RSSI value.

When the RSSI values of the network device indicate a weakening signal (e.g., the second RSSI value detected after a delay time is weaker than the first RSSI value), the policy enforcement application releases the set of policies previously implemented on the network device (block 712).

b. Trip Continuance

Figure 8:
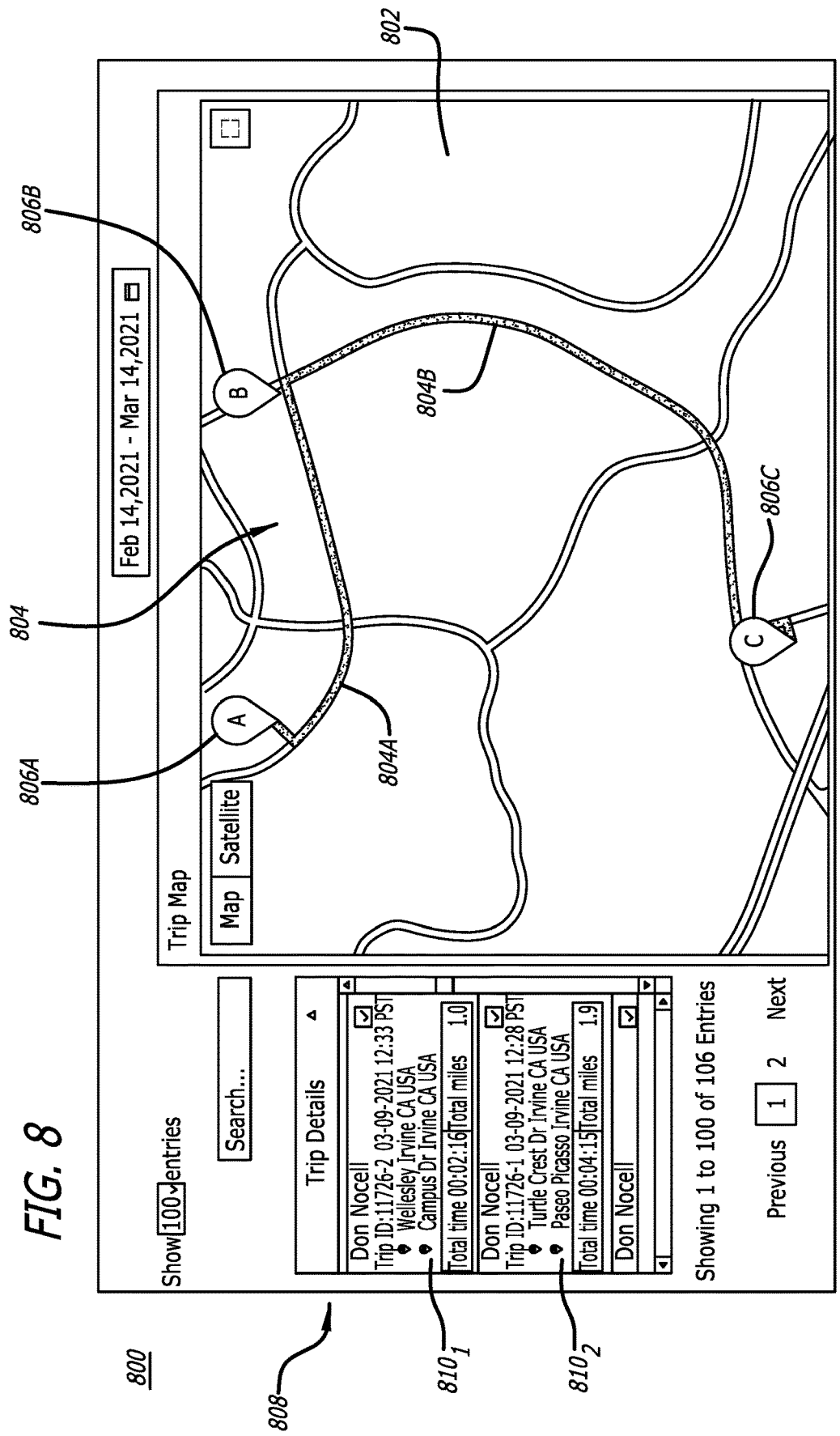
FIG. 8 is a graphical user interface providing an illustrative mapping of a trip monitored by the policy enforcement application of FIG. 6 installed on a network device located within a vehicle where the trip is comprised of a series of trip segments stitched together.

Referring now to FIG. 8, a graphical user interface providing an illustrative mapping of a trip monitored by the policy enforcement application of FIG. 6 installed on a network device located within a vehicle where the trip is comprised of a series of trip segments stitched together is shown in accordance with some embodiments.

FIG. 8 illustrates the graphical user interface (GUI) 800 that may be displayed on a display screen of a network device, such as a laptop screen, a display of a desktop computer, a screen of a tablet, a screen of a mobile phone, etc. The GUI 800 includes a map display window 802 that displays a map or satellite view of the geographic region of a network device traveling within a vehicle. Additionally, the GUI 800 includes a first trip indicator 804 comprised of trip segment indicators 804A, 804B and 804C as well as stop indicators 806A-806C. The first stop indicator 806A ("A") indicates the beginning of the trip, the second stop indicator 806B ("B") indicates the first stop and the trip segment indicator 804A illustrates the route that the vehicle took when traveling from the beginning of the trip to the first stop. Similarly, the third stop indicator 806C ("C") indicates the second stop of the trip and the trip segment indicator 804B illustrates the route that the vehicle took when traveling from the first stop to the second stop. As should be understood, a trip may have one or more trip segments and the disclosure is not intended to be limited to a trip comprised of two trip segments.

Additionally, the GUI 800 includes a side panel 808 that details a trip and/or trip segments of a single trip. As illustrated, the side panel 808 illustrates a series of trip segment details $810_1$-$810_i$ (i≥1, where i=2 for this embodiment) of the trip segments that comprise the trip illustrated by the trip indicator 804.

The GUI 800 may be illustrative of the GUI displayed to an administrator and enables the administrator to visualize the trips and trip segments taken by certain drivers. The GUI 800 is generated based on data received from the instances of the policy enforcement applications operating on network devices during and/or after trips taken in a vehicle that includes a transceiver (or similarly functioning device or apparatus). As noted above, when a network device having the policy enforcement application operating thereon enters a vehicle with a transceiver and the vehicle attains a speed of at least a speed threshold, the policy enforcement application begins recording the trip. Basic data pertaining to the trip such as timing and location may be obtained by the policy enforcement application and provided to the policy enforcement server system 102 of FIGS. 1A-1B, which may then generate the GUI 800 by logic of the system 102. In addition to the timing and location data, the policy enforcement application may also obtain, and provide to the policy enforcement server system 102, other monitored data such as timing of implementation/release of policy, movement of the network device (e.g., which may indicate a device handling event), any policy violations that may occur (e.g., use or attempted use of the network device following implementation of a set of policies), etc. This data may be provided to the policy enforcement server system 102 in real-time (during trips) and/or following completion of a trip.

As shown, the GUI 800 may include trip segment details $810_1$-$810_2$ that each indicate a driver's name or identifier (e.g., "Don Nocell"), a trip and trip segment identifier (e.g., "11726" referring to the trip identifier and "1" or "2" referring to the trip segment identifier), a starting location (e.g., "Wellesley, Irvine, Calif. USA"), an ending location (e.g., "Campus Dr, Irvine, Calif. USA"), a total time and/or a time distance of the trip segment. The discussion of the methods 900, 914 and 1000 provide further detail as to operations performed by logic of the policy enforcement server system 102 regarding monitoring and recording of trips as well as trip segments.

Referring now to FIG. 9A, a flowchart of an exemplary process of determining a duration of a trip following the implementation of a set of policies on a network device by the policy enforcement application of FIG. 6 is shown in accordance with some embodiments. Each block illustrated in FIG. 9A represents an operation performed in the method 900 of determining a duration of a trip following the implementation of a set of policies on a network device by the policy enforcement application. Prior to performance of the operations of the method 900, it may be assumed that network device having the policy enforcement application operating thereon is located within a vehicle. It may be further assumed that a transceiver, such as the transceiver 104, is also located within the vehicle. Specifically, the transceiver may be affixed to an upper left corner, a lower left corner or generally the left side of the vehicle's windshield relative to the driver's perspective. In other embodiments, the transceiver may be affixed to the dashboard behind the steering wheel or otherwise in line with a driver's seat. In yet other examples, the transceiver may be affixed to the ceiling of the vehicle above the steering wheel or the driver's seat.

The method 900 commences when the policy enforcement application operating on a network device detects movement above a speed threshold as well as the presence of a transceiver (block 902). Specifically, the instant network device includes components configured to obtain data indicating speed (e.g., a GPS unit) and the transceiver may include components to detect movement including an accelerometer and a vibration sensor, as seen in FIG. 2. With respect to the transceiver, an acceleration of zero (0) mph and a predetermined continuous time frame of a lack of detected vibration, together, indicate the transceiver is not moving (or otherwise has a speed of zero (0) mph). For example, the vibration sensor performs a vibration detection at regular intervals (e.g., every second), where the vibration sensor records a '1' when vibration is detected and a '0' when vibration is not detected. The combination of an acceleration of zero (0) mph and a continuous string of a predetermined number of 0's (e.g., eight) may indicate to the transceiver and/or the policy enforcement application that the transceiver (and thus the vehicle) is not moving (has a speed of zero (0) mph). It should be understood that the predetermined number of 0's needed to indicate no movement may be configurable (e.g., via software updates provided to the transceiver and/or the policy enforcement application), such that varying vehicles may have varying requirements. For example, some vehicles employ a "stop-start system," which entails the engine of the vehicle shutting off when the vehicle is at rest in order to reduce fuel usage (e.g., when at a stop light), which eliminates vibration of such vehicles for a predetermined time before starting again (e.g., vibrating). Thus, transceiver and/or policy enforcement applications associated with such vehicles may have a longer requirement of continuous 0's, such as 30 for example.

In one embodiment, the movement detection logic 620 obtains data from a GPS unit of the instant network device and determines whether the speed indicated by the GPS unit data satisfies the predetermined speed threshold. For example, the movement detection logic 620 may determine whether the instant network device is traveling at a speed of at least 5 mph. Similarly, the movement detection logic 620 may obtain data from the transceiver (obtained from the vibration sensor and the accelerometer) and determine whether the vibration data and acceleration data indicate movement of the transceiver.

Still referring to FIG. 9A, following the determination that the speed of the network device is above the speed threshold as well as that the transceiver is present, the policy enforcement application implements a set of policies on the network device to restrict or limit the use of a network device (block 904). Implementation of the set of policies is discussed above at least with respect to the method 300. Subsequently, the policy enforcement application determines that the network device speed is zero (0) mph and the transceiver indicates no movement (block 906). For example, the policy enforcement application has determined that the vehicle has come to a stop. In such an instance, the policy enforcement application begins decrementing a trip duration counter. The trip duration counter refers to a time period pertaining to a predetermined stoppage time that, when met (e.g., decrements to 0), indicates the end of a trip. Stated differently, when the trip duration counter has decremented to 0, the vehicle has been determined to have been stopped for a predetermined time (e.g., one minute, two minutes, etc.), which in turn has been determined to indicate the trip has ended. The trip duration counter may be configurable by an administrator (e.g., via software updates or configuration files provided to the network device).

While the network device speed is zero (0) mph (or remains below the speed threshold of block 902) and the transceiver indicates no movement, the trip duration counter decrements to zero (0) and the policy enforcement application ends the trip (blocks 908-910). Particulars of the trip may be recorded in a trip log and/or provided directly to an administrator. Examples of the particulars of the trip may be discussed above at least with respect to FIG. 8.

As an alternative to decrementing the trip duration counter, the policy enforcement application may perform operations to initiate the policy release counter and determine whether (or when) the policy release counter satisfies a counting requirement. In some embodiments, initiating the policy release counter and satisfying the counting requirement includes decrementing from a set value to zero as illustrated in FIG. 9A. In alternative embodiments, initiating the policy release counter and satisfying the counting requirement includes incrementing a value from zero to a set value.

Figure 9B:
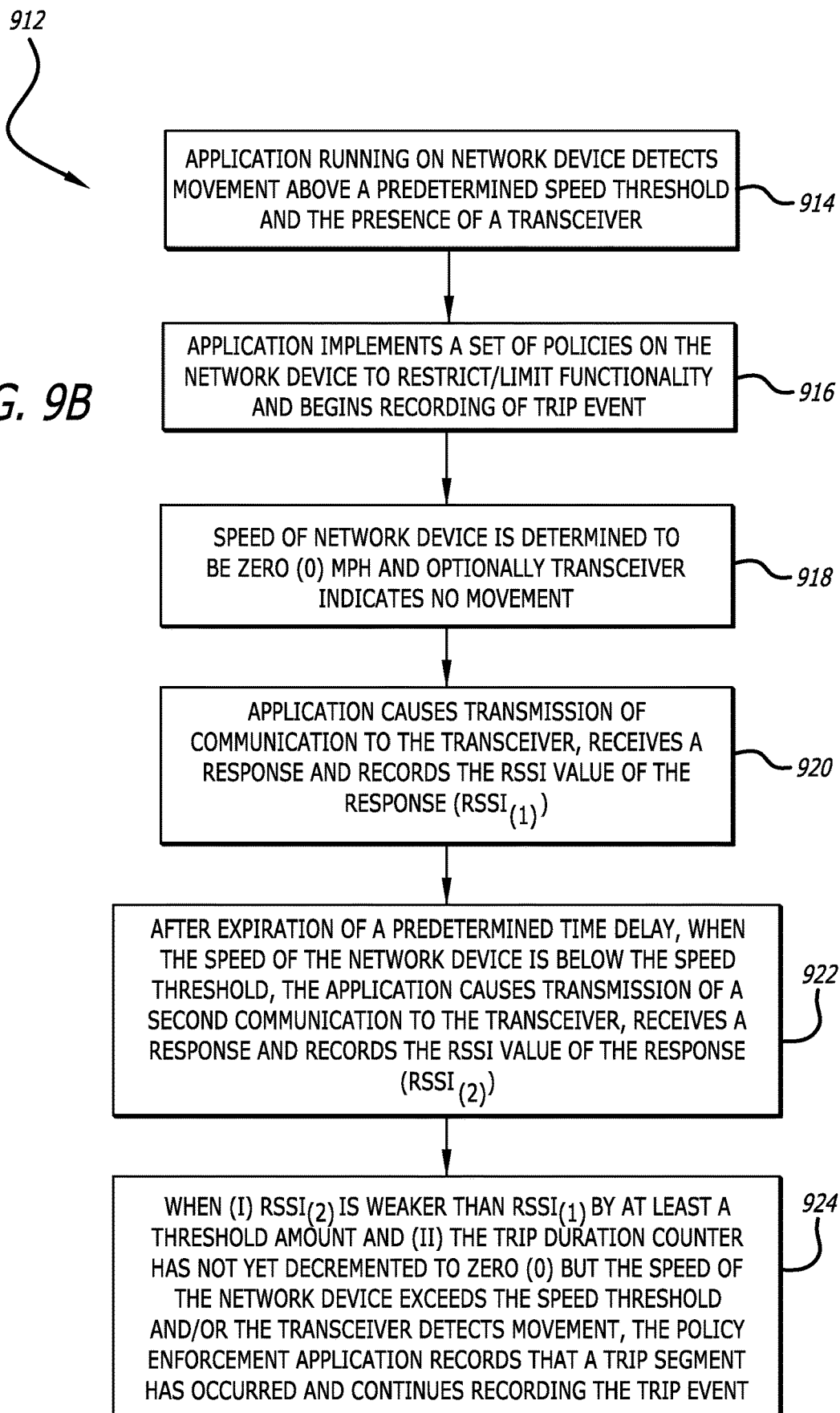
FIG. 9B illustrates a flowchart of an exemplary process of determining the existence of a trip segment within an encompassing trip by the policy enforcement application of FIG. 6.

Referring to FIG. 9B, a flowchart of an exemplary process of determining the existence of a trip segment within an encompassing trip by the policy enforcement application of FIG. 6 is shown in accordance with some embodiments. Each block illustrated in FIG. 9B represents an operation performed in the method 912 of determining the existence of a trip segment within an encompassing trip by the policy enforcement application. Prior to performance of the operations of the method 912, the same assumptions may apply as discussed above with respect to the method 900.

The method 912 commences when the policy enforcement application operating on a network device detects movement above a speed threshold as well as the presence of a transceiver (block 914), which corresponds to block 902 of FIG. 9A. Following the determination that the speed of the network device is above the speed threshold as well as that the transceiver is present, the policy enforcement application implements a set of policies on the network device to restrict or limit the use of the network device (block 916), which corresponds to block 904 of FIG. 9A. Subsequently, the policy enforcement application determines that the network device speed is zero (0) mph and the transceiver indicates no movement (block 918), which corresponds to block 906 of FIG. 9A. In such an instance, the policy enforcement application begins decrementing a trip duration counter.

The policy enforcement application then causes transmission of a request communication to the transceiver and receives a response communication (block 920). For example, the request communication may be a request for a RSSI of the network device and the response communication may include the RSSI value ("first RSSI value"). The first RSSI value corresponds to the signal strength of request communication transmitted by the network device to the transceiver, which is indicative of the physical proximity of the network device to the transceiver at the time the request communication was transmitted.

After expiration of a predetermined time delay and when the speed of the network device remains below the speed threshold and the transceiver indicates no movement, the policy enforcement application causes transmission of a second request communication to the transceiver and receives a second response communication that includes a RSSI value ("second RSSI value") (block 922). The second RSSI value is indicative of the physical proximity of the network device to the transceiver at the time the second request communication was transmitted.

When the second RSSI value is weaker than the first RSSI value by at least a threshold amount (e.g., a net weakening of the signal by 10 dBm, or alternatively by ≥20%) and the trip duration counter has not yet decremented to zero (0) but the speed of the network device exceeds the speed threshold and/or the transceiver detects movement, the policy enforcement application records that a trip segment has occurred and continues recording the trip event (block 924). Thus, the policy enforcement application has determined that the vehicle has started a trip event (detecting the speed of the network device meets or exceeds a threshold and that the transceiver indicates movement), then detected a stop and that the RSSI value of the network weakens over time (e.g., indicating the driver has left the vehicle and taken the network device, which may be to complete a delivery for example) and further detected that the vehicle has begun moving again prior to the trip duration counter decrementing to zero (0). As a result, the policy enforcement application records the occurrence of a trip segment, which spans from the time that the vehicle began moving until the time that the vehicle stopped and the weakening of the RSSI value of the network device was detected. Recording of a trip segment may entail recording particulars as illustrated in at least FIG. 8.

As is understood, decibels per milliwatt (dBm) is the unit used in measuring a power level (e.g., signal strength) of an electrical signal and a decibel is a dimensionless unit used for quantifying a ratio between two values. Thus, RSSI values are indicated in dBm, where a stronger signal is indicated by a higher RSSI value (e.g., a RSSI value of −35 dBm indicates a stronger than a RSSI value of −80 dBm).

Based on the operations of the method 912, routine stops by the vehicle (traffic lights, traffic signs, stop-and-go traffic, etc.) will not trigger recording of a trip segment because during routine stop situations the RSSI value of the network device will not weaken by at least the threshold amount as the driver will not leave the vehicle during that time.

Figure 10A:
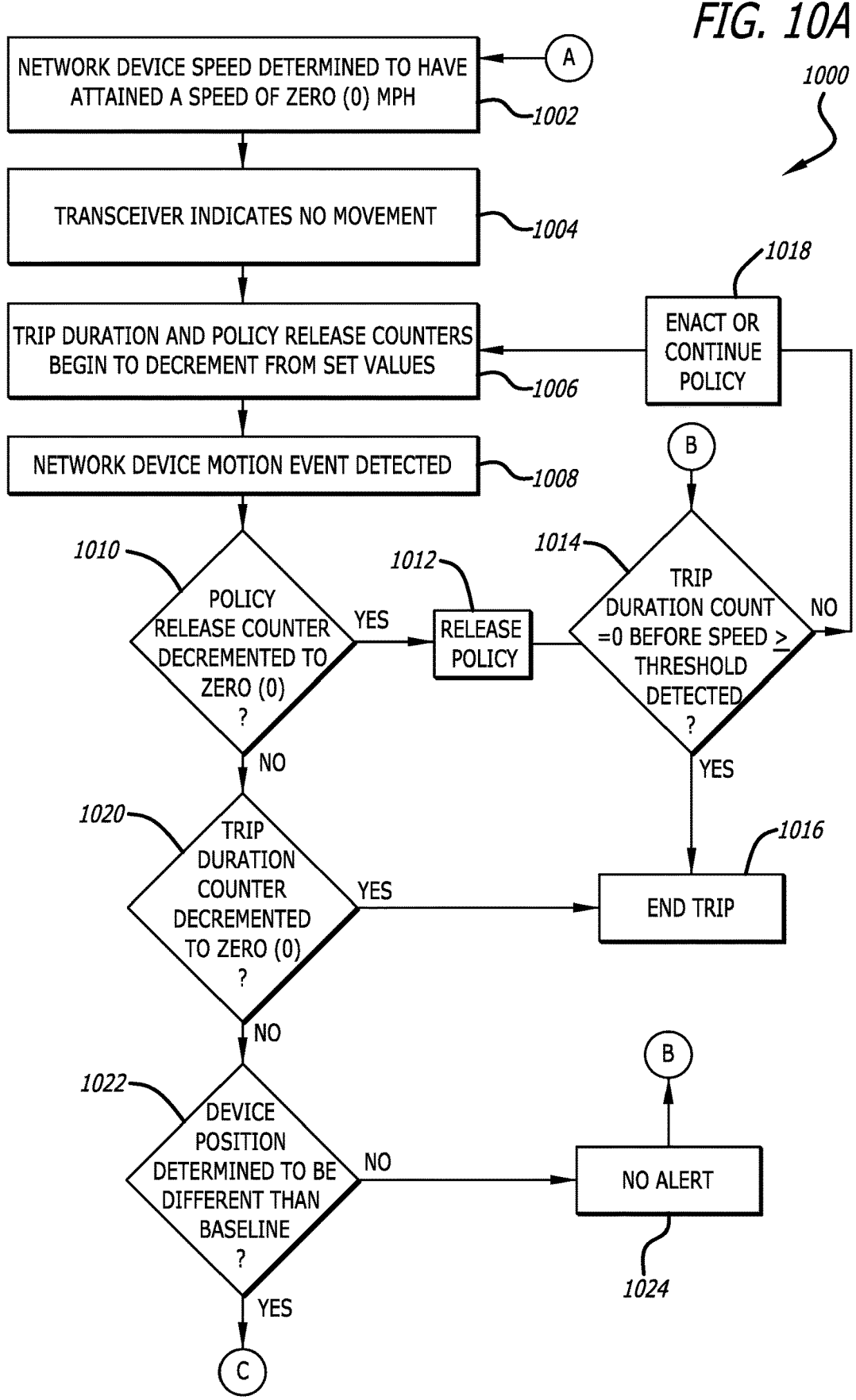
FIGS. 10A-10B illustrate a flowchart of an exemplary process of monitoring the duration of a trip and determining whether the trip is comprised of a plurality of trip segments by the policy enforcement application of FIG. 6.
Figure 10B:
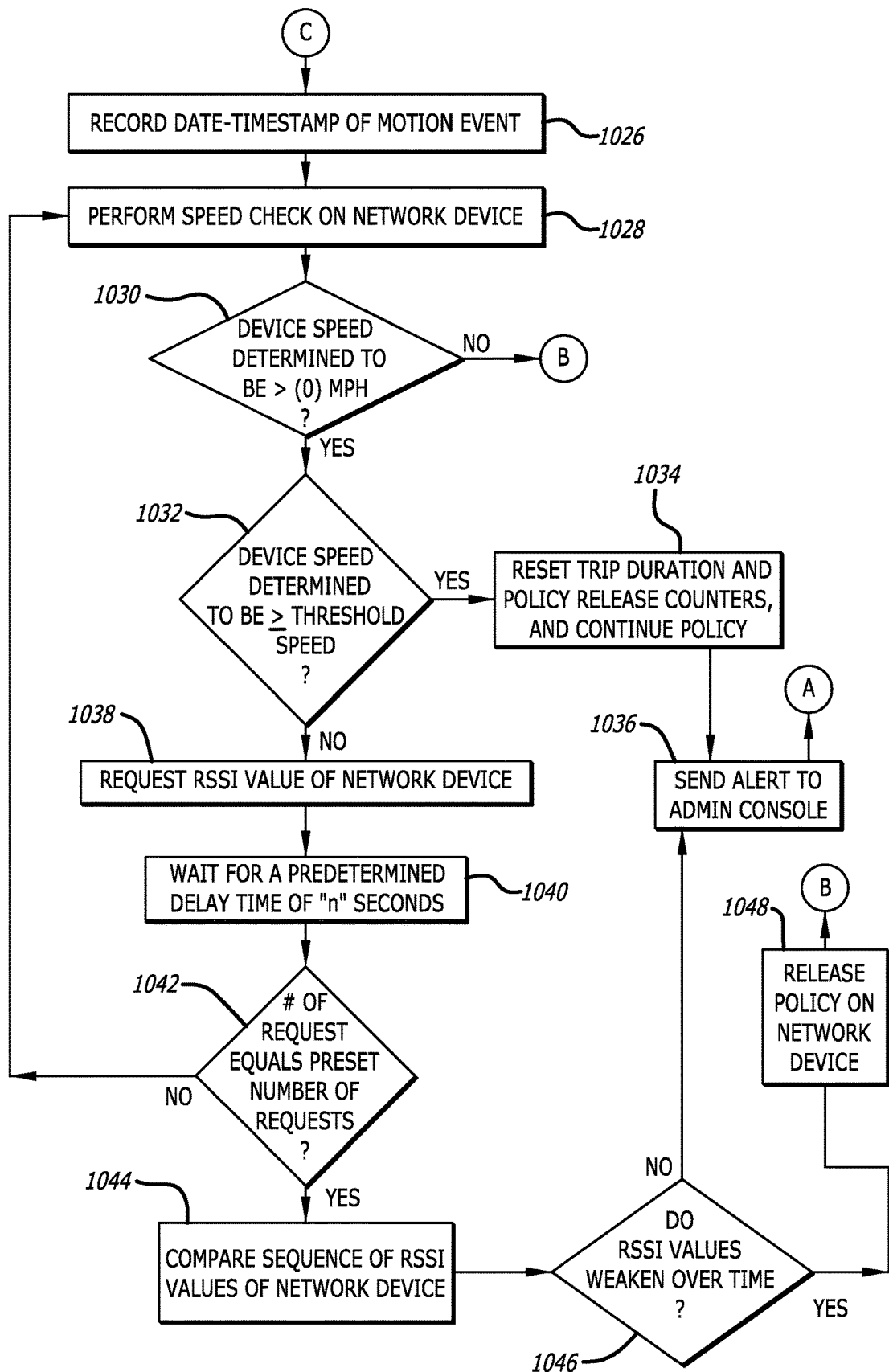

Referring now to FIGS. 10A-10B, a flowchart of an exemplary process of monitoring the duration of a trip and determining whether the trip is comprised of a plurality of trip segments by the policy enforcement application of FIG. 6 is shown in accordance with some embodiments. Each block illustrated in FIGS. 10A-10B represents an operation performed in the method 1000 of monitoring the duration of a trip and determining whether the trip is comprised of a plurality of trip segments by the policy enforcement application. Prior to performance of the operations of the method 1000, the same assumptions may apply as discussed above with respect to the methods 900 and 912.

The method 1000 commences when the network device is determined to have attained a speed of zero (0) mph and the transceiver indicates no movement (blocks 1002-1004). Subsequently, the policy enforcement application begins to decrement both the trip duration counter and a policy release counter (block 1006). The policy release counter represents a time value that, when expired, initiates the release of the set of policies implemented on the network device. Following detection of a position change ("motion event"), a determination is made as to whether the policy release counter has decremented to zero (0), and, when such has occurred, the set of policies is released (blocks 1008-1012). Following the release of the set of policies, when the trip duration counter decrements to zero (0) before a speed of the network device that meets or exceeds the speed threshold is detected, the trip is ended (blocks 1014-1016). Particulars of the trip may be recorded in a trip log and/or provided directly to an administrator. Examples of the particulars of the trip may be discussed above at least with respect to FIG. 8.

Alternatively, following the release of the set of policies, when the trip duration counter does not decrement to zero (0) before a speed of the network device that meets or exceeds the speed threshold is detected, policy is reenacted (or re-implemented) and the method 1000 returns to block 1006 (blocks 1014, 1018).

In the event that the policy release counter has not decremented to zero (0) but the trip duration counter has decremented to zero (0), the trip is ended and particulars of the trip may be recorded (blocks 1010, 1020, 1016). However, when neither the policy release counter nor the trip duration counter have decremented to zero (0), a determination as to whether the network device position is different than a baseline position by a threshold amount (e.g., rotation values for X-, Y-, and Z- have changed by ≥+/−20%) is made (block 1022). The baseline position refers to an X/Y/Z position of the network device that is recorded in response to detection of the transceiver and the speed of the network device meeting or exceeding the speed threshold. The position baseline allows the policy enforcement application to detect deviation of the network device from the position baseline. The policy enforcement application detects the network device's X/Y/Z position using the network device's gyroscope. The gyroscope of the network device may provide rotation values for each of an X-, Y- and Z-axis (referred to as X/Y/Z position data) to the policy enforcement application. The network device's X/Y/Z position may include the pitch, the roll and the yaw of the network device.

When the network device position is not different than the baseline by at least the threshold amount, no alert is provided (block 1024) and the method 1000 continues to block 1014. However, when the network device position is different than the baseline by at least the threshold amount, the policy enforcement application records the date-timestamp of the motion event and performs a speed check on the network device (blocks 1026-1028). When the speed of the network device is equal to zero (0) mph, the method 1000 continues to block 1014 (no at block 1030). When the speed is greater than zero (0) mph, a determination is made as to whether the speed of the network device meets or exceeds the threshold speed (block 1032).

When the device speed does not meet or exceed the threshold speed, the policy enforcement application requests the RSSI value of the network device at a current time and, after a delay time, determines whether the number of requests equals a preset number of requests (e.g., five (5) requests) (blocks 1038, 1040, 1042). When the number of requests is less than the preset number of requests, the method 1000 continues to block 1028 (no at block 1042). However, when the number of requests is equal to the present number of requests, the sequence of RSSI values are compared to determine whether the RSSI values weaken over time by a threshold percentage or a threshold value (blocks 1044-1046). When the RSSI values weaken over time, the set of policies are released on the network device and the method continues to block 1014 (block 1048). However, when the RSSI values do not weaken over time, an alert is sent to an administrator (and optionally to the user of the network device) and the method 1000 continues to block 1002.

Referring back to block 1032, when the device speed is determined to be equal to or greater than the threshold speed, the policy enforcement application resets the trip duration and policy release counters and continues implementing the set of policies (blocks 1032, 1034). Further, an alert is sent to an administrator (and optionally to the user of the network device) and the method 1000 continues to block 1002.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method for releasing a set of policies implemented on a network device, the computerized method comprising:

detecting, by the network device, a speed of the network device is zero miles per hour (mph);

initiating, by logic processing on the network device, a policy release counter;

determining, by the logic processing on the network device, a position of the network device has changed prior to the policy release counter satisfying a counting requirement;

detecting, by the network device, the speed of the network device is greater than zero mph and less than a threshold speed;

requesting, by the logic processing on the network device, a first received signal strength indicator (RSSI) value and a second RSSI value from a transceiver, wherein the first RSSI value corresponds to a first communication transmitted by the network device to the transceiver and the second RSSI value corresponds to a second communication transmitted by the network device to the transceiver following expiration of a delay time after transmission of the first communication;

comparing, by the logic processing on the network device, the first RSSI value and the second RSSI value; and when comparing the second RSSI value to the first RSSI value indicates a signal strength of the second communication is weaker than a signal strength of the first communication by at least a threshold amount, releasing, by the logic processing on the network device, the set of policies implemented on the network device.

2. The computerized method of claim 1, wherein prior to initiating the policy release counter, detecting, by the network device, (i) the speed of the network device is zero mph, and (ii) the transceiver in communication with the network device indicates no movement.

3. The computerized method of claim 1, wherein initiating the policy release counter includes initiating a decrement from a value corresponding to the policy release counter.

4. The computerized method of claim 1, wherein determining the position of the network device has changed includes obtaining a measurement from a gyroscope of the network device indicating rotation about at least one of an X-, Y- or Z-axis of the network device.

5. The computerized method of claim 4, wherein rotation about any of the X-, Y- or Z-axis is measured in radians per second.

6. The computerized method of claim 1, wherein satisfaction of the counting requirement includes the policy release counter decrementing to zero.

7. The computerized method of claim 6, wherein the decrementing occurs once per second.

8. The computerized method of claim 1, wherein satisfaction of the counting requirement includes incrementing from zero to a value represented by the policy release counter.

9. The computerized method of claim 8, wherein the incrementing occurs once per second.

10. The computerized method of claim 1, further comprising:

when the second RSSI value is weaker than the first RSSI value by at least the threshold amount, continuing implementation of the set of policies on the network device.

11. A computerized method for determining a duration of a trip event following implementation of a set of policies on a network device, the computerized method comprising:

beginning, by logic processing on the network device, recording of the trip event;

detecting, by the network device, a speed of the network device is zero miles per hour (mph);

requesting, by logic processing on the network device, a first received signal strength indicator (RSSI) value of the network device and a second RSSI value of the network device from a transceiver; and when (i) comparing the second RSSI value to the first RSSI value indicates a signal strength of the second communication is weaker than a signal strength of the first communication by at least a threshold amount, and (ii) a trip duration counter has not yet decremented to zero (0) but either (a) a speed of the network device meets a speed threshold or (b) the transceiver detects movement, recording, by logic processing on the network device, that a trip segment has occurred.

12. The computerized method of claim 11, wherein prior to requesting the first RSSI value of the network device and the second RSSI value of the network device, detecting, by the network device, (i) the speed of the network device is zero mph, and (ii) the transceiver in communication with the network device indicates no movement.

13. The computerized method of claim 11, further comprising:

prior to detecting the speed of the network device is zero mph, detecting, by the network device, the speed of the network device being above a predetermined threshold and detecting presence of the transceiver; and implementing the set of policies on the network device, wherein the implementation of the set of policies is configured to restrict functionality of the network device according to a predefined list of functionalities.

14. The computerized method of claim 11, wherein the first RSSI value corresponds to a first communication transmitted by the network device to the transceiver and the second RSSI value corresponds to a second communication transmitted by the network device to the transceiver following expiration of a delay time after transmission of the first communication.

15. The computerized method of claim 11, wherein the trip segment corresponds to an entirety of the trip event.

16. The computerized method of claim 11, further comprising:

subsequent to recording that the trip segment occurred, continuing recording, by the logic of processing on the network device, the trip event.

17. The computerized method of claim 16, further comprising:

detecting, by the network device, the speed of the network device is zero mph;

initiating, by the logic processing on the network device, the trip duration counter;

determining, by the logic processing on the network device, the duration trip counter satisfies a counting requirement prior to the detecting, by the network device, that the speed of the network device meets the speed threshold; and determining, by the logic processing on the network device, that the trip event has ended.

18. A non-transitory computer readable storage medium having stored thereon instructions, the instructions being executable by one or more processors to perform operations comprising:

beginning recording of a trip event of a network device;

detecting a speed of the network device is zero miles per hour (mph);

requesting a first received signal strength indicator (RSSI) value of the network device and a second RSSI value of the network device from a transceiver; and when (i) comparing the second RSSI value to the first RSSI value indicates a signal strength of the second communication is weaker than a signal strength of the first communication by at least a threshold amount, and (ii) a trip duration counter has not yet decremented to zero (0) but either (a) a speed of the network device meets a speed threshold or (b) the transceiver detects movement, recording that a trip segment has occurred.

19. The non-transitory computer readable storage medium of claim 18, wherein prior to requesting the first RSSI value of the network device and the second RSSI value of the network device, detecting, by the network device, (i) the speed of the network device is zero mph, and (ii) the transceiver in communication with the network device indicates no movement.

20. The non-transitory computer readable storage medium of claim 18, wherein the instructions being executable by the one or more processors to perform operations further comprising:
prior to detecting the speed of the network device is zero mph, detecting, by the network device, the speed of the network device being above a predetermined threshold and detecting presence of the transceiver; and
implementing a set of policies on the network device, wherein the implementation of the set of policies is configured to restrict functionality of the network device according to a predefined list of functionalities.

21. The non-transitory computer readable storage medium of claim 18, wherein the first RSSI value corresponds to a first communication transmitted by the network device to the transceiver and the second RSSI value corresponds to a second communication transmitted by the network device to the transceiver following expiration of a delay time after transmission of the first communication.

22. The non-transitory computer readable storage medium of claim 18, wherein the trip segment corresponds to an entirety of the trip event.

23. The non-transitory computer readable storage medium of claim 18, wherein the instructions being executable by the one or more processors to perform operations further comprising:
subsequent to recording that the trip segment occurred, continuing recording, by the logic of processing on the network device, the trip event.

24. The non-transitory computer readable storage medium of claim 23, wherein the instructions being executable by the one or more processors to perform operations further comprising:
initiating, by the logic processing on the network device, a trip duration counter;
determining, by the logic processing on the network device, the trip duration counter satisfies a counting requirement prior to the detecting, by the network device, that the speed of the network device meets the speed threshold; and
determining, by the logic processing on the network device, that the trip event has ended.

* * * * *